United States Patent
Nishigo

(10) Patent No.: US 11,343,407 B2
(45) Date of Patent: May 24, 2022

(54) SHADING CORRECTION DEVICE, READING DEVICE, IMAGE FORMING APPARATUS, SHADING CORRECTION METHOD, AND NON-TRANSITORY RECORDING MEDIUM

(71) Applicant: Atsuki Nishigo, Kanagawa (JP)

(72) Inventor: Atsuki Nishigo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/336,307

(22) Filed: Jun. 2, 2021

(65) Prior Publication Data
US 2021/0400166 A1  Dec. 23, 2021

(30) Foreign Application Priority Data
Jun. 23, 2020  (JP) .............................. JP2020-108225

(51) Int. Cl.
*H04N 1/401* (2006.01)

(52) U.S. Cl.
CPC ..... *H04N 1/401* (2013.01); *H04N 2201/0081* (2013.01)

(58) Field of Classification Search
CPC ........... H04N 1/401; H04N 2201/0081; H04N 1/3875; H04N 1/38; H04N 2201/0082; H04N 1/00795; H04N 1/00843; H04N 1/00848; H04N 1/00875; H04N 1/1017; H04N 1/203; H04N 1/2038; H04N 1/41; H04N 17/002; H04N 1/00681; H04N 1/0071; H04N 1/00713; H04N 1/00718; H04N 1/00737; H04N 1/00753;
(Continued)

(56) References Cited

U.S. PATENT DOCUMENTS

| 4,926,251 A | * | 5/1990 | Sekizawa ........... H04N 1/19505 |
| | | | 358/535 |
| 7,064,868 B2 | * | 6/2006 | Kawano ............. H04N 1/40075 |
| | | | 382/199 |

(Continued)

FOREIGN PATENT DOCUMENTS

| JP | 2016-039416 | 3/2016 |
| JP | 2017-220855 | 12/2017 |

*Primary Examiner* — Negussie Worku
(74) *Attorney, Agent, or Firm* — Xsensus LLP

(57) ABSTRACT

A shading correction device includes first and second extractors, an intersection calculator, a phase shift amount calculator, a phase shifter, a generator, and a corrector. The first extractor extracts a first periodic component of original shading data. The second extractor extracts a second periodic component of a second reading result. The intersection calculator calculates a first intersection of the first component and a reference level and a second intersection of the second component and the reference level. The phase shift amount calculator calculates a phase shift amount at each of plural positions with a difference between the first and second intersections. The phase shifter shifts a phase of the first component with the phase shift amount. The generator generates corrected shading data including the phase-shifted first component and the original shading data with the first component smoothed. The corrector performs shading correction based on the corrected shading data.

17 Claims, 21 Drawing Sheets

(58) Field of Classification Search
CPC ........... H04N 1/00769; H04N 1/00774; H04N 1/00822; H04N 1/00838; H04N 1/00846; H04N 1/193; H04N 1/3248; H04N 1/32486; H04N 1/60; H04N 1/6027; H04N 2201/3288; H04N 1/00015; H04N 1/00034; H04N 1/00045; H04N 1/00068; H04N 1/00087; H04N 1/00408; H04N 1/00572; H04N 1/00588; H04N 1/00591; H04N 1/00596; H04N 1/00602; H04N 1/00663; H04N 1/00689; H04N 1/00692; H04N 1/00694; H04N 1/00801; H04N 1/00806; H04N 1/00811; H04N 1/00859; H04N 1/00864; H04N 1/00867; H04N 1/00872; H04N 1/00883; H04N 1/00912; H04N 1/00915; H04N 1/02835; H04N 1/0314; H04N 1/12; H04N 1/1931; H04N 1/1934; H04N 1/29; H04N 1/32101; H04N 1/32122; H04N 1/32443; H04N 1/3247; H04N 1/32561; H04N 1/32609; H04N 1/032635; H04N 1/32657; H04N 1/3872; H04N 1/40; H04N 1/40012; H04N 1/40056; H04N 1/4072; H04N 1/409; H04N 1/4115; H04N 1/46; H04N 1/484; H04N 1/506; H04N 1/56; H04N 1/6005; H04N 1/6016; H04N 1/6019; H04N 1/6025; H04N 1/603; H04N 1/6033; H04N 1/6047; H04N 1/6058; H04N 1/6072; H04N 2201/041; H04N 2201/042; H04N 2201/3225; H04N 2201/3271; H04N 2201/3274; H04N 2201/3287; H04N 2209/048; H04N 5/20; H04N 5/208; H04N 5/232935; H04N 5/2351; H04N 5/2353; H04N 5/2355; H04N 5/262; H04N 5/33; H04N 5/35581; H04N 5/3692; H04N 7/0122; H04N 9/045; H04N 9/646; G06V 10/457; G06V 10/462; G06V 30/10; G06V 30/1478; G06T 7/001; G06T 2207/30148; G06T 7/0004; G06T 2207/10024; G06T 2207/10116; G06T 2207/30176; G06T 3/40; G06T 5/002; G06T 7/0002; G06T 7/0012; G06T 7/90; G06T 1/0071; G06T 2201/0051; G06T 2207/10008; G06T 2207/20021; G06T 2207/20024; G06T 2207/20081; G06T 2207/20204; G06T 2207/20208; G06T 2207/20221; G06T 2207/30004; G06T 2207/30061; G06T 2207/30088; G06T 2207/30144; G06T 2207/30168; G06T 3/4007; G06T 5/00; G06T 5/004; G06T 5/005; G06T 5/009; G06T 5/20; G06T 5/50; G06T 7/12; G06T 7/62; G06T 7/66; G06T 7/68; G06T 7/70; G06T 7/80; G03G 21/04; G03G 15/01; G03G 15/22; G03G 15/224; G03G 15/36; G03G 15/5012; G03G 15/502; G03G 15/5025; G03G 15/6538; G03G 21/046; G03G 2215/00257; G03G 2215/0174; G06K 9/00; G06K 9/46; G06K 15/00; G06K 15/027; G06K 15/1878; G06K 2215/004; G06K 2215/0085; G06K 9/32; G06K 9/36; G06K 9/40; G06F 16/2428; G06F 16/26; G06F 3/1297; G06F 40/45; G06F 40/58
USPC ........................................................ 358/474
See application file for complete search history.

(56) References Cited

U.S. PATENT DOCUMENTS

| | | | | |
|---|---|---|---|---|
| 8,351,707 | B2* | 1/2013 | Sakamoto | G06V 30/1478 382/192 |
| 8,630,025 | B2* | 1/2014 | Hayakawa | H04N 1/00774 358/453 |
| 9,485,881 | B2* | 11/2016 | Nagamori | B60K 1/00 |
| 2007/0165280 | A1* | 7/2007 | Yago | G06F 16/5846 358/448 |
| 2010/0315689 | A1* | 12/2010 | Hayakawa | H04N 1/00774 358/474 |
| 2016/0005348 | A1* | 1/2016 | Yanagi | G09G 3/20 345/600 |
| 2016/0173722 | A1* | 6/2016 | Uchida | G06T 1/20 358/1.9 |

* cited by examiner

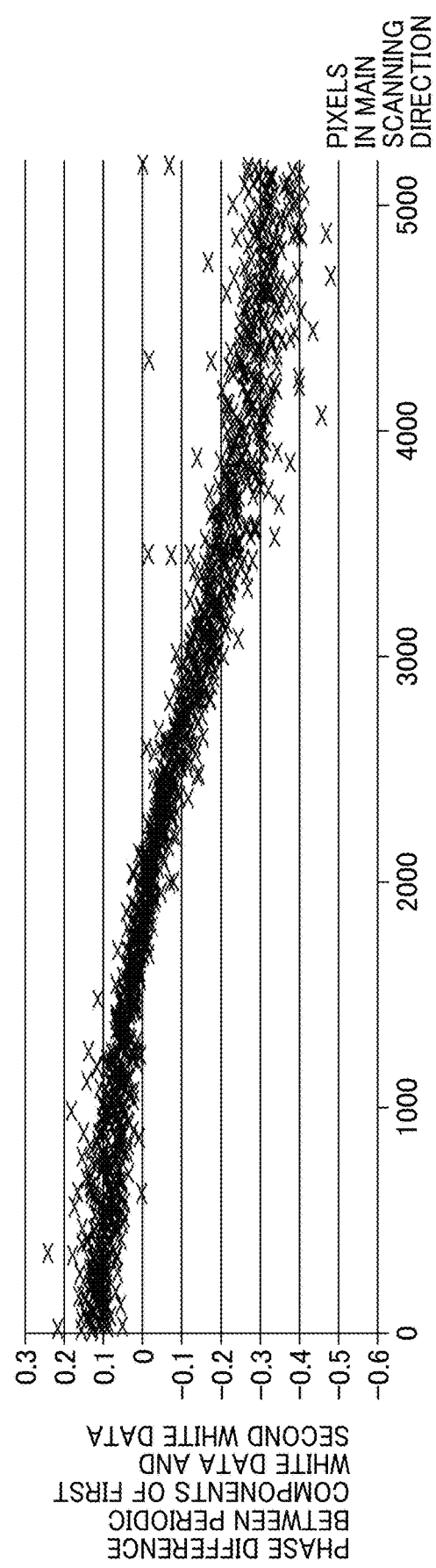
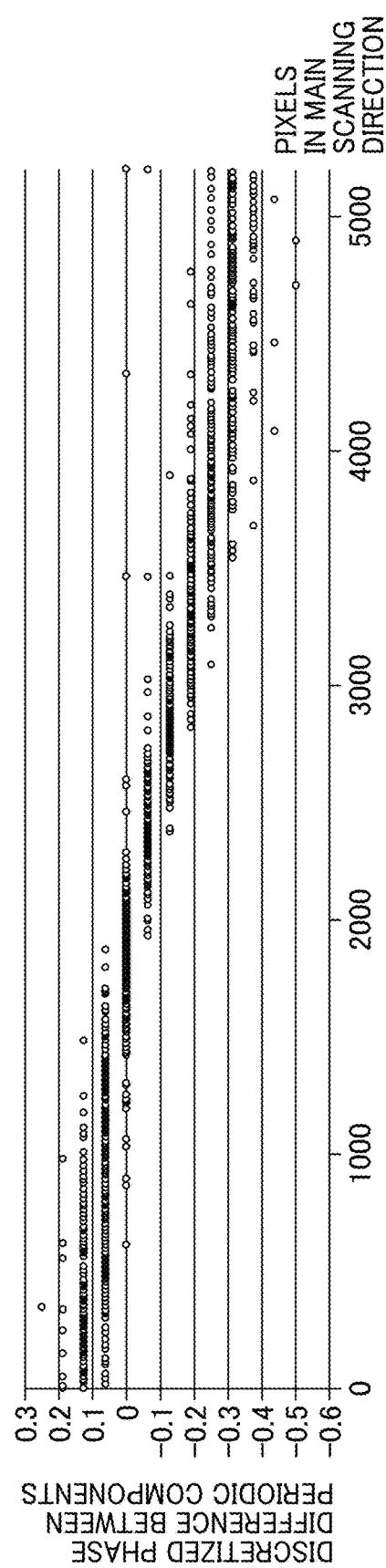

FIG. 10

| SHIFT AMOUNT (PHASE DIFFERENCE d) | CORRECTION PARAMETERS | | | |
|---|---|---|---|---|
| | W1 | W2 | W3 | W4 |
| 0/32 | 0 | 1 | 0 | 0 |
| 1/32 | −4/128 | 1 | 4/128 | 0 |
| 2/32 | −7/128 | 127/128 | 8/128 | 0 |
| 3/32 | −10/128 | 126/128 | 13/128 | −1/128 |
| 4/32 | −12/128 | 124/128 | 18/128 | −2/128 |
| 5/32 | −14/128 | 122/128 | 23/128 | −3/128 |
| 6/32 | −16/128 | 120/128 | 28/128 | −4/128 |
| 7/32 | −17/128 | 117/128 | 33/128 | −5/128 |
| 8/32 | −18/128 | 114/128 | 38/128 | −6/128 |
| 9/32 | −19/128 | 111/128 | 43/128 | −7/128 |
| 10/32 | −19/128 | 107/128 | 49/128 | −9/128 |
| 11/32 | −19/128 | 103/128 | 54/128 | −10/128 |
| 12/32 | −19/128 | 99/128 | 59/128 | −11/128 |
| 13/32 | −18/128 | 94/128 | 65/128 | −13/128 |
| 14/32 | −18/128 | 90/128 | 70/128 | −14/128 |
| 15/32 | −17/128 | 85/128 | 75/128 | −15/128 |
| 16/32 | −16/128 | 80/128 | 80/128 | −16/128 |
| 17/32 | −15/128 | 75/128 | 85/128 | −17/128 |
| 18/32 | −14/128 | 70/128 | 90/128 | −18/128 |
| 19/32 | −13/128 | 65/128 | 94/128 | −18/128 |
| 20/32 | −11/128 | 59/128 | 99/128 | −19/128 |
| 21/32 | −10/128 | 54/128 | 103/128 | −19/128 |
| 22/32 | −9/128 | 49/128 | 107/128 | −19/128 |
| 23/32 | −7/128 | 43/128 | 111/128 | −19/128 |
| 24/32 | −6/128 | 38/128 | 114/128 | −18/128 |
| 25/32 | −5/128 | 33/128 | 117/128 | −17/128 |
| 26/32 | −4/128 | 28/128 | 120/128 | −16/128 |
| 27/32 | −3/128 | 23/128 | 122/128 | −14/128 |
| 28/32 | −2/128 | 18/128 | 124/128 | −12/128 |
| 29/32 | −1/128 | 13/128 | 126/128 | −10/128 |
| 30/32 | 0 | 8/128 | 127/128 | −7/128 |
| 31/32 | 0 | 4/128 | 1 | −4/128 |

SHADING CORRECTION DEVICE, READING DEVICE, IMAGE FORMING APPARATUS, SHADING CORRECTION METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2020-108225 filed on Jun. 23, 2020 in the Japan Patent Office, the entire disclosure of which is hereby incorporated by reference herein.

BACKGROUND

Technical Field

The present invention relates to a shading correction device, a reading device, an image forming apparatus, a shading correction method, and a non-transitory recording medium.

Description of the Related Art

In a typical image reading device, shading correction is performed to correct the variation in distribution of the light amount between positions in the main scanning direction of an optical reading system and the variation in sensitivity between pixels of a sensor chip. Specifically, the shading correction is performed on input data based on the comparison between a reading result obtained through reading a white density reference member in the manufacturing process of the image reading device (i.e., shading data) and a reading result obtained through reading the white density reference member immediately before document reading.

In an image reading device that reads a document with an array of refractive index distribution lenses, such as a contact image sensor (CIS), the output from the image sensor contains a periodic component derived from the lens pitch of the refractive index distribution lenses. Since the thermal environment is different between during the manufacturing process and immediately before the document reading, the periodic component obtained immediately before the document reading is shifted in phase from the periodic component obtained during the manufacturing process. According to a typical shading data correction technique, the phase of the periodic component of the shading data obtained during the manufacturing process is shifted with a plurality of different shift amounts to generate a plurality of periodic components with different phases. Then, each of the periodic components with the different phases is compared, in blocks, with the periodic component of the reading result obtained immediately before the document reading, and shading data with a reduced phase difference is generated, i.e., the shading data is corrected.

According to this shading data correction technique, however, an attempt to accurately correct the phase shift involves an increase in the circuit size.

SUMMARY

In one embodiment of this invention, there is provided an improved shading correction device that includes, for example, a first extractor, a second extractor, an intersection point calculator, a phase shift amount calculator, a phase shifter, a generator, and a corrector. The first extractor extracts a first periodic component of original shading data. The original shading data is a first reading result obtained through reading a density reference member. The second extractor extracts a second periodic component of a second reading result. The second reading result is obtained through reading the density reference member at a time different from a time of reading the density reference member to obtain the original shading data. The intersection point calculator calculates a first intersection point of the first periodic component and a reference level and a second intersection point of the second periodic component and the reference level. The phase shift amount calculator calculates a phase shift amount at each of a plurality of positions based on a difference between the first intersection point and the second intersection point. The phase shifter shifts a phase of the first periodic component based on the calculated phase shift amount at the each of the plurality of positions. The generator generates corrected shading data including the first periodic component with the shifted phase and the original shading data with the first periodic component smoothed. The corrector performs shading correction with the generated corrected shading data. The first extractor, the second extractor, the intersection point calculator, the phase shift amount calculator, the phase shifter, the generator, and the corrector are implemented by circuitry.

In one embodiment of this invention, there is provided an improved reading device that includes, for example, a plurality of pixels and the above-described shading correction device. The shading correction device performs the shading correction on a read signal with the corrected shading data. The read signal is input from each of the plurality of pixels.

In one embodiment of this invention, there is provided an improved image forming apparatus that includes, for example, a reading device and an image forming device. The reading device reads an image from a reading target. The reading device includes a plurality of pixels and the above-described shading correction device that performs the shading correction on the read image with the corrected shading data. The read image corresponds to a read signal input from each of the plurality of pixels. The image forming device forms, on a medium, the read image subjected to the shading correction.

In one embodiment of this invention, there is provided an improved shading correction method that includes, for example, extracting a first periodic component of original shading data, the original shading data being a first reading result obtained through reading a density reference member, extracting a second periodic component of a second reading result, the second reading result being obtained through reading the density reference member at a time different from a time of reading the density reference member to obtain the original shading data, calculating a first intersection point of the first periodic component and a reference level and a second intersection point of the second periodic component and the reference level, calculating a phase shift amount at each of a plurality of positions based on a difference between the first intersection point and the second intersection point, shifting a phase of the first periodic component based on the calculated phase shift amount at the each of the plurality of positions, generating corrected shading data including the first periodic component with the shifted phase and the original shading data with the first periodic component smoothed, and performing shading correction with the generated corrected shading data.

In one embodiment of this invention, there is provided a non-transitory recording medium storing a plurality of instructions which, when executed by one or more processors, cause the processors to perform the above-described shading correction method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7A is a graph illustrating an example of the distribution in the main scanning direction of a detected phase difference in the first embodiment;

FIG. 7B is a graph illustrating an example of the result of discretizing the distribution in the main scanning direction of the phase difference with 32 phase shift amounts;

FIG. 10 is a table illustrating an example of correction parameters for a shift amount of the first embodiment, in which an inter-pixel interval is divided by 32;

Figure 1A:
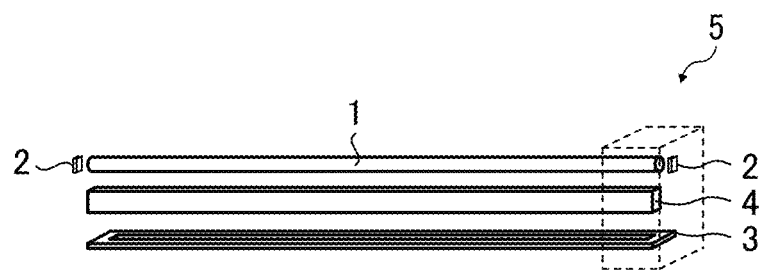
FIGS. 1A and 1B are diagrams illustrating an exemplary configuration of a reading module as an example of a reading device according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of a shading correction device, a reading device, an image forming apparatus, a shading correction method, and a non-transitory recording medium of the present invention will be described in detail below with reference to the accompanying drawings.

In a reading device for reading an image, for example, shading correction is performed to correct the variation in distribution of the light amount between positions in the main scanning direction of an optical reading system and the variation in sensitivity between pixels of a sensor chip. Specifically, the operation of equation (01) given below is performed in which SD represents a reading result of reading a white plate (i.e., shading data) and Din represents input data, to thereby obtain a result Dout of shading correction performed on the input data Din. The white plate is a density reference member in a particular white color.

$$Dout = Din/SD \qquad (01)$$

If the white plate used to generate the shading data for the shading correction is smeared, the value of the shading data corresponding to the location of the smear hinders accurate shading correction. That is, accurate shading correction is not performed on the pixel data of the pixel corresponding to the location of the smear in the white plate in the main scanning direction of the optical reading system such as a line image sensor, for example (i.e., in the direction in which pixels are arranged). Consequently, there arises inconvenience such as noise appearing as a streak in an image generated through the scanning with the optical reading system in the sub-scanning direction perpendicular to the main scanning direction in two dimensions, specifically a streak corresponding to the location of the smear in the white plate.

Specifically, if the white plate has a dark smear, the dark smear absorbs reading light or causes diffused reflection of the reading light, reducing the incident light on the pixels at the location of the dark smear as compared with the other locations, thereby causing a drop in the value of the generated shading data. If the shading data with this drop in the value thereof is used in the shading correction, the value of the denominator in the above-described equation (01) is reduced, thereby increasing the value of the shading correction result and thus causing a white streak (i.e., insufficient shading correction). If the white plate has a whitish smear, on the other hand, the whitish smear increases the amount of reflection of the reading light, thereby increasing the incident light on the pixels at the location of the whitish smear as compared with the other locations, and thus increasing the value of the generated shading data. If the shading data with this increased value is used in the shading correction, the value of the denominator in the equation (01) is increased, thereby reducing the value of the shading correction result and thus causing a dark streak (i.e., excessive shading correction).

The following description will be given of preferred embodiments in which the reading result obtained through reading the white plate during the manufacturing process (i.e., the original shading data) is corrected with the reading result obtained through reading the white plate immediately before the document reading.

A first embodiment of the present invention will be described.

In the first embodiment described below, a shading correction device is applied to a reading device for better understanding of a form of use of the shading correction device. The reading device is a device that includes optical lenses and an image sensor and performs processes such as image processing on a signal read from a reading target by the image sensor (i.e., a read signal or a read image).

Figure 1B:
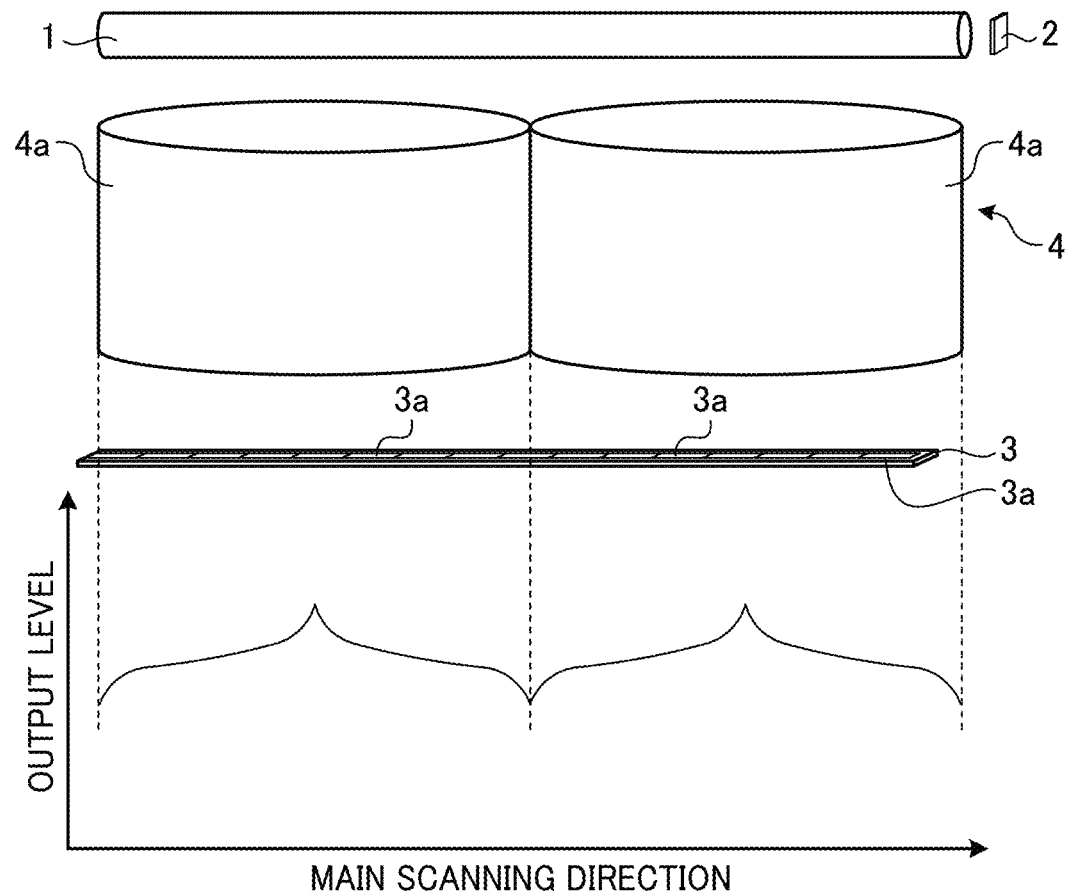

FIGS. 1A and 1B are diagrams illustrating an exemplary configuration of a reading device of the first embodiment. FIGS. 1A and 1B illustrate an exemplary configuration of a reading module 5 an example of the reading device. The reading module 5 is configured as a contact image sensor (CIS) that reads the image without magnification. FIG. 1A is an exploded perspective view of the reading module 5. FIG. 1B is an enlarged view of a part of the reading module 5 indicated by broken lines in FIG. 1A. FIG. 1B further illustrates an example of the output level of the signal from the reading module 5 in the main scanning direction.

The reading module 5 illustrated in FIGS. 1A and 1B includes a light guide 1, a light source 2, an image sensor 3, and a rod lens array 4. The image sensor 3 includes a plurality of pixels (i.e., photoelectric conversion elements) 3a. The rod lens array 4 includes a plurality of rod lenses 4a, which are refractive index distribution lenses. The light source 2 is a light emitting diode (LED), a fluorescent light, or a cold-cathode tube, for example. The light guide 1 and the light source 2 form an irradiation device that irradiates, with light, an area of a document along the main scanning direction (hereinafter referred to as the main scanning area of the document) or a white plate serving as a density reference member. The image sensor 3 is included in an integrated circuit such as an application specific integrated circuit (ASIC). With the pixels 3a, the image sensor 3 reads the main scanning area of the document or the white plate. In the present example, a fixed white plate not equipped with a moving mechanism for changing the reading area is used as an example of the white plate.

Via the light guide 1, the irradiation device irradiates the main scanning area of the document or the fixed white plate with the light emitted from the light source 2. The light reflected from the main scanning area of the document or the fixed white plate is read with the pixels 3a of the image sensor 3 via the rod lenses 4a of the rod lens array 4. The image sensor 3 receives the incident light output from the corresponding rod lenses 4a. As illustrated in FIG. 1B, the output level of the signal increases toward the center of each of the rod lenses 4a, and decreases toward the edge of the rod lens 4a. Therefore, the output from each of the pixels 3a of the image sensor 3 contains a component that periodically fluctuates in accordance with the lens pitch of the rod lenses 4a.

A description will be given of a configuration of circuit blocks included in the integrated circuit, for example.

Figure 2:
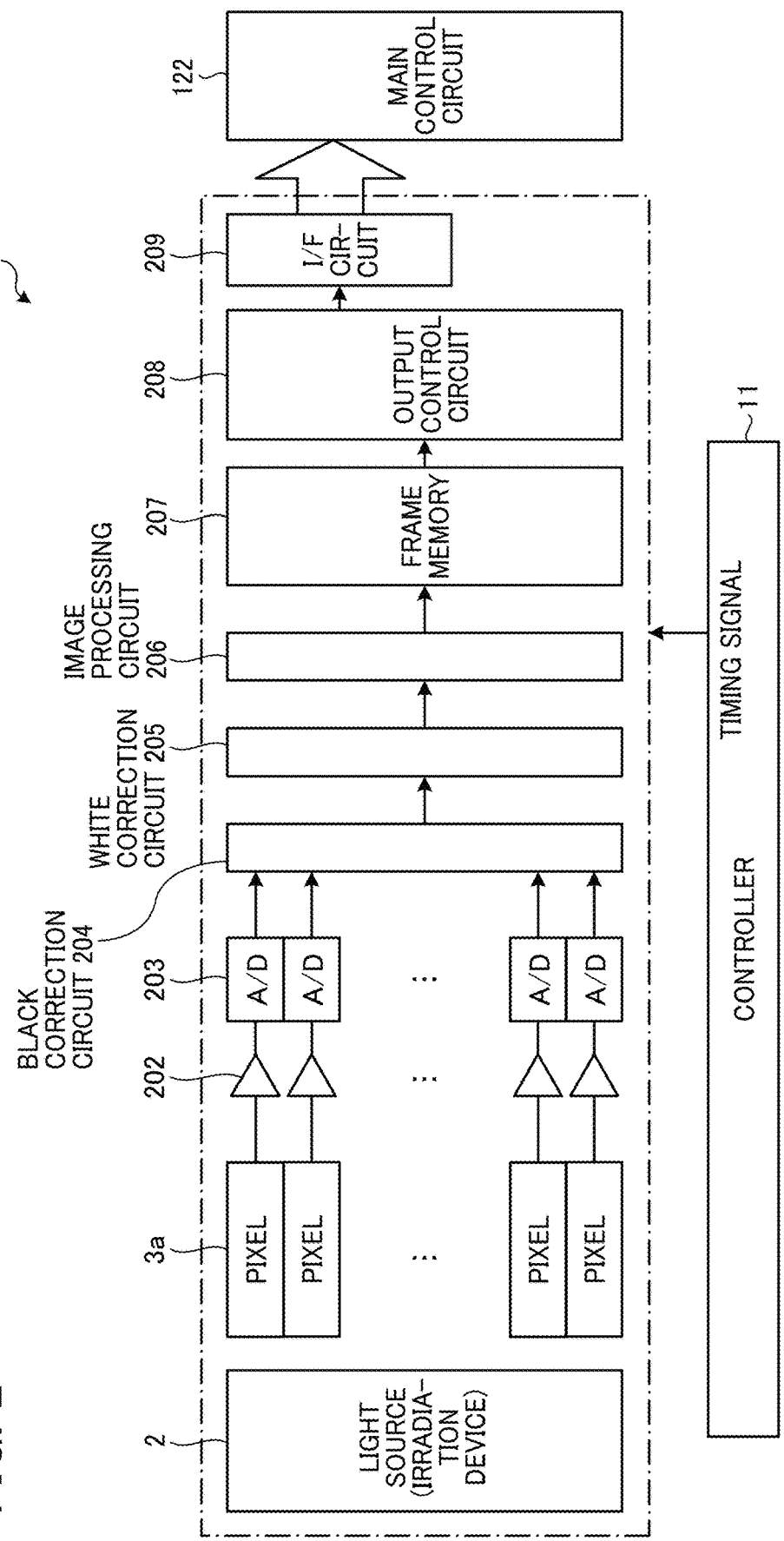
FIG. 2 is a diagram illustrating an exemplary configuration of circuit blocks of the reading module of the first embodiment.

FIG. 2 is a diagram illustrating an exemplary configuration of circuit blocks of the reading module 5. As illustrated in FIG. 2, the reading module 5 includes the plurality of pixels 3a arranged in the main scanning direction, a plurality of amplifier circuits 202 respectively connected to the plurality of pixels 3a, and a plurality of analog-to-digital (A/D) converters 203 respectively connected to the plurality of amplifier circuits 202. An output signal (i.e., a read signal or a read image) from each of the A/D converters 203 is input to a black correction circuit 204 and a white correction circuit 205 to be subjected to the shading correction. The output signal subjected to the shading correction is then subjected to processes such as an inter-line correction process by an image processing circuit 206, and is temporarily stored in a frame memory 207. Then, via an output control circuit 208 and an interface (I/F) circuit 209, the output signal is output from the reading module 5 as image data. Each of the above-described circuits operates based on a timing signal from a controller 11. The black correction circuit 204 eliminates a black level offset component from the output signal from each of the A/D converters 203. A main control circuit 122 in FIG. 2 will be described later.

The white correction circuit 205 performs a white correction process on the output signal, from which the black level offset component has been eliminated by the black correction circuit 204. The white correction process is mainly performed to eliminate the adverse effect on the image data caused by non-uniform irradiation of the light source 2 and uneven sensitivity of the pixels 3a.

The white correction circuit 205 will be described in more detail.

In the white correction process, the original shading data as the result of previously reading the clean fixed white plate in the manufacturing process of the reading module 5 (also referred to as the first white reference data or the first white data) is first stored in a memory. Then, the fixed white plate attached to the reading module 5 (i.e., the reading device) is read immediately before the document reading to obtain the result thereof (also referred to as the second white reference data or the second white data). Then, white correction is performed based on the comparison between the second white reference data and the first white reference data. The above-described times of reading the fixed white plate are illustrative, and thus are not limited to during the manufacturing process and immediately before the document reading. The first white reference data may be obtained at a time other than during the manufacturing process, as long as the first white reference data is read from the clean fixed white plate. Further, the second white reference data may be obtained at a time other than immediately before the document reading, as long as the time of obtaining the second white reference data is different from the time of obtaining the first white reference data.

Regardless of the actual time of reading the fixed white plate, the ambient temperature is different between the time of reading the fixed white plate to obtain the first white reference data and the time of reading the fixed white plate to obtain the second white reference data, depending on the thermal environment of the location of use of the reading module 5, or on the scan mode such as continuous scan for continuously scanning multiple documents, for example. The rod lenses 4a and the integrated circuit including the image sensor 3 have different thermal expansion rates. This difference in the thermal expansion rate causes a phase shift in the light incident on the pixels 3a of the image sensor 3. If the phase shift is left uncorrected, the correspondence between the first white reference data and the second white reference data is lost. According to the reading module 5 (i.e., the reading device) of the present embodiment, therefore, the phase shift in the first white reference data as the original shading data is corrected so that the phase of the first white reference data is adjusted to that of the second white reference data obtained in the thermal environment immediately before the document reading.

Figure 3:
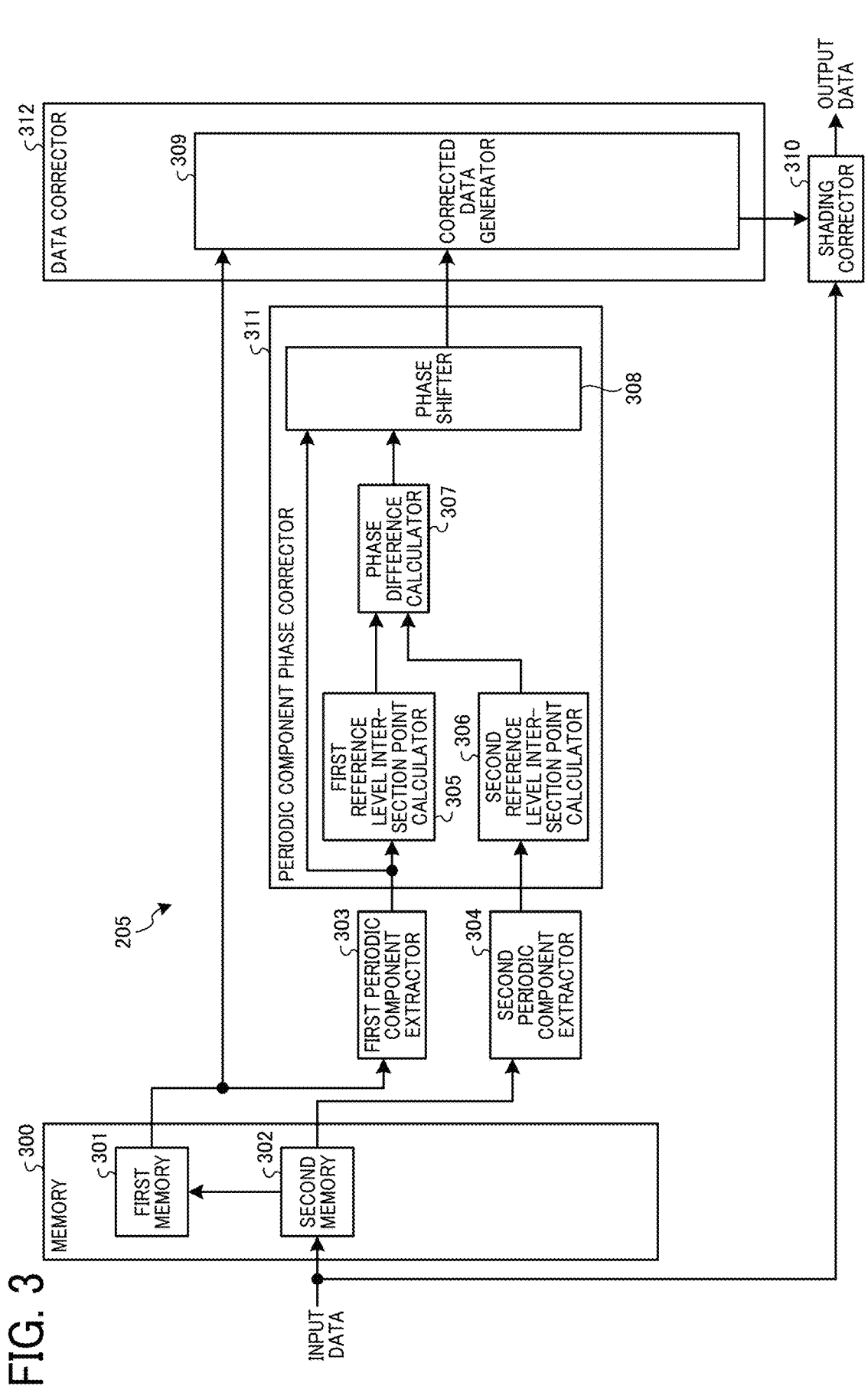
FIG. 3 is a diagram illustrating an exemplary configuration of functional blocks of a white correction circuit included in the reading module of the first embodiment to correct a phase shift.

FIG. 3 is a diagram illustrating an exemplary configuration of functional blocks of the white correction circuit 205 that corrects the phase shift. The white correction circuit 205 illustrated in FIG. 3 includes a first memory 301, a second memory 302, a first periodic component extractor 303, a second periodic component extractor 304, a first reference level intersection point calculator 305, a second reference level intersection point calculator 306, a phase difference calculator 307, a phase shifter 308, a corrected data generator 309, and a shading corrector 310. The first memory 301 and the second memory 302 are included in a memory 300. The first reference level intersection point calculator 305, the second reference level intersection point calculator 306, the phase difference calculator 307, and the phase shifter 308 are included in a periodic component phase corrector 311. The corrected data generator 309 is included in a data corrector 312.

The first periodic component extractor 303 corresponds to a first extractor. The second periodic component extractor 304 corresponds to a second extractor. The first reference level intersection point calculator 305 and the second reference level intersection point calculator 306 correspond to an intersection point calculator. The phase difference calculator 307 corresponds to a phase shift amount calculator. The phase shifter 308 corresponds to a phase shifter. The corrected data generator 309 corresponds to a generator. The shading corrector 310 corresponds to a corrector.

The first memory 301 stores the first white reference data. The second memory 302 stores the second white reference data.

The first periodic component extractor 303 extracts a first periodic component from the first white reference data stored in the first memory 301, and outputs the extracted first periodic component. The second periodic component extractor 304 extracts a second periodic component from the second white reference data stored in the second memory 302, and outputs the extracted second periodic component. Each of the first periodic component and the second periodic component is a periodic component derived from the arrangement of the rod lenses 4a.

The first reference level intersection point calculator 305 calculates a first intersection point, which is the intersection point of the first periodic component and a predetermined reference level. The second reference level intersection point calculator 306 calculates a second intersection point, which is the intersection point of the second periodic component and the predetermined reference level.

Based on the difference between the first intersection point and the second intersection point, the phase difference calculator 307 calculates the phase difference between the first periodic component and the second periodic component.

The phase shifter 308 shifts the phase of the first periodic component of the first white reference data in accordance with the calculated phase difference.

The corrected data generator 309 combines the phase-shifted first periodic component with the first white reference data from which the first periodic component has been eliminated, to thereby generate corrected data (i.e., corrected shading data) in which the phase of the first white reference data has been corrected.

The shading corrector 310 performs the shading correction with the corrected data generated by the corrected data generator 309.

A specific description will be given of respective configurations of the first periodic component extractor 303, the second periodic component extractor 304, the first reference level intersection point calculator 305, the second reference level intersection point calculator 306, the phase difference calculator 307, the phase shifter 308, the corrected data generator 309, and the shading corrector 310 with reference to an example.

Figure 4:
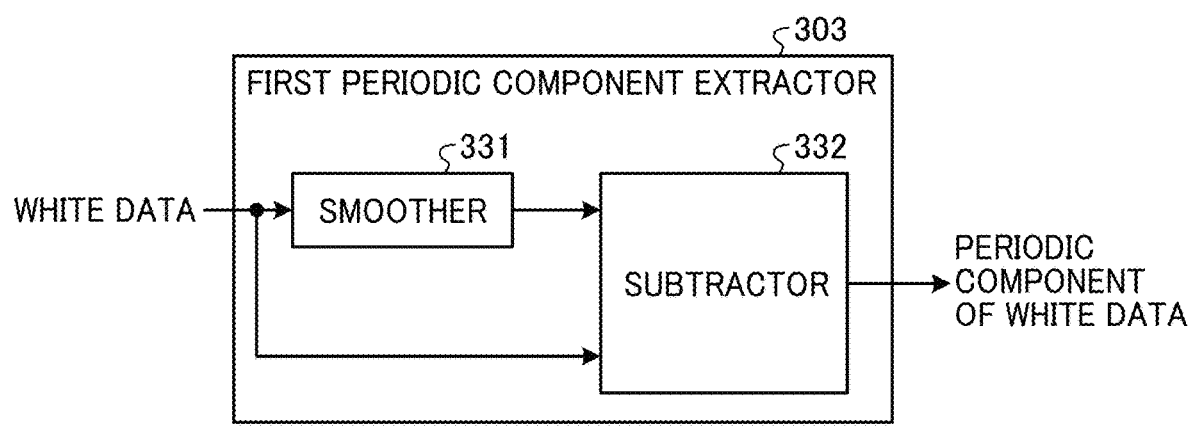
FIG. 4 is a diagram illustrating an exemplary configuration of functional blocks of a first periodic component extractor included in the white correction circuit of the first embodiment.
Figure 5A:
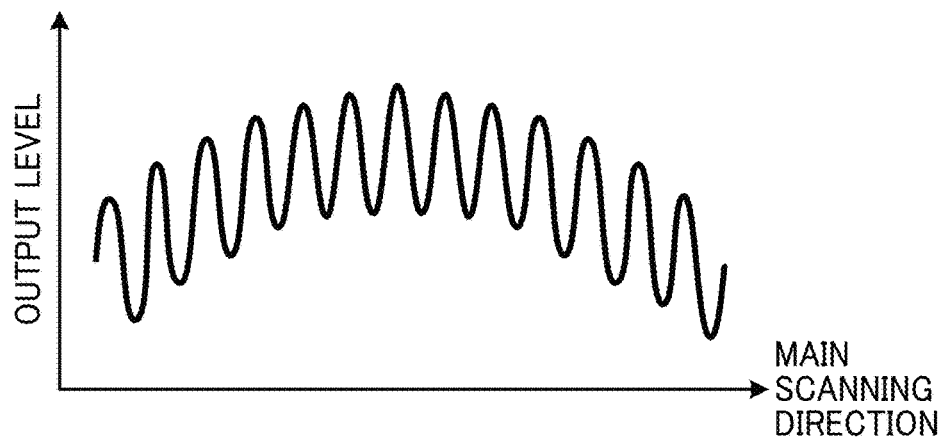
FIGS. 5A, 5B, and 5C are graphs schematically illustrating a process of the first periodic component extractor of the first embodiment.
Figure 5B:
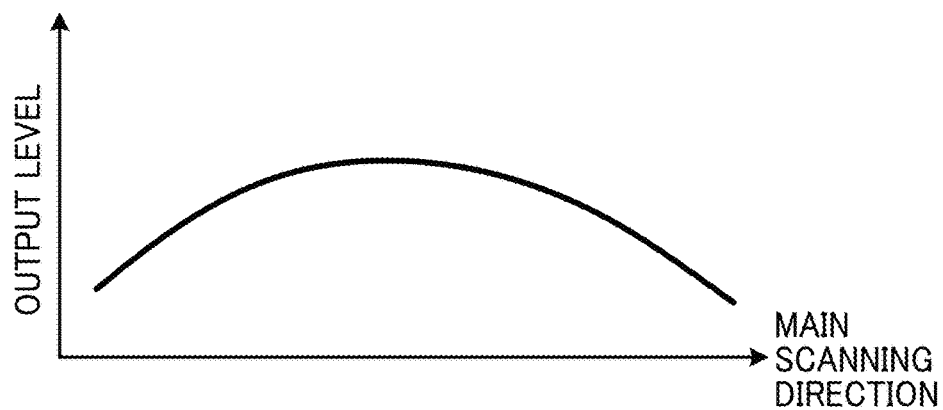
Figure 5C:
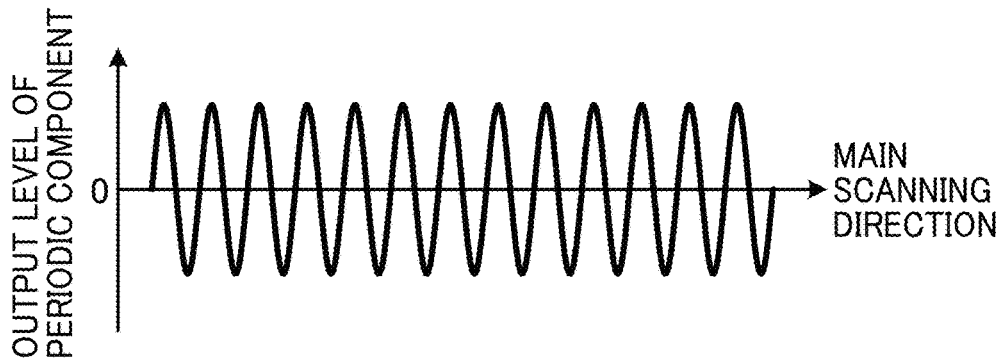

FIG. 4 is a diagram illustrating an exemplary configuration of functional blocks of the first periodic component extractor 303. FIGS. 5A, 5B, and 5C are graphs schematically illustrating a process of the first periodic component extractor 303. As illustrated in FIG. 4, the first periodic component extractor 303 includes a smoother 331 and a subtractor 332. The smoother 331 and the subtractor 332 illustrated in FIG. 4 will be described in detail with reference to FIGS. 5A to 5C.

FIG. 5A illustrates output data from the first memory 301. FIG. 5B illustrates output data from the smoother 331 of the first periodic component extractor 303. FIG. 5C illustrates output data from the first periodic component extractor 303.

As illustrated in FIG. 5A, in the main scanning direction in which the pixels 3a are arranged, the first white reference data has a waveform combining the first periodic component derived from the arrangement of the rod lenses 4a and a gradually changing component determined by the characteristics of an optical system of the reading module 5 (i.e., the reading device). In the first periodic component extractor 303, the smoother 331 smooths the first periodic component of the first white reference data derived from the arrangement of the rod lenses 4a, and outputs the smoothed first white reference data. For example, the smoother 331 smooths the first periodic component with the moving average, and outputs the first white reference data with the first periodic component eliminated therefrom, as illustrated in FIG. 5B. The subtractor 332 calculates the difference between the first white reference data and the smoothed first white reference data, and outputs the first periodic component, as illustrated in FIG. 5C.

The configuration for extracting the first periodic component is not limited to the above-described example. Further, if the fluctuation in the gradually changing component is uniform, the extraction may be performed such that the extracted first periodic component has an offset component.

The second periodic component extractor 304 is similar in configuration to the first periodic component extractor 303. The description of the second periodic component extractor 304 is thus redundant and will be omitted here.

The first periodic component output from the first periodic component extractor 303 is input to the first reference level intersection point calculator 305. The second periodic component output from the second periodic component extractor 304 is input to the second reference level intersection point calculator 306.

The first reference level intersection point calculator 305 calculates the first intersection point at which the output level of the first periodic component intersects a predetermined output level set as the reference level. The second reference level intersection point calculator 306 calculates the second intersection point at which the output level of the second periodic component intersects the predetermined reference level.

Figure 6A:
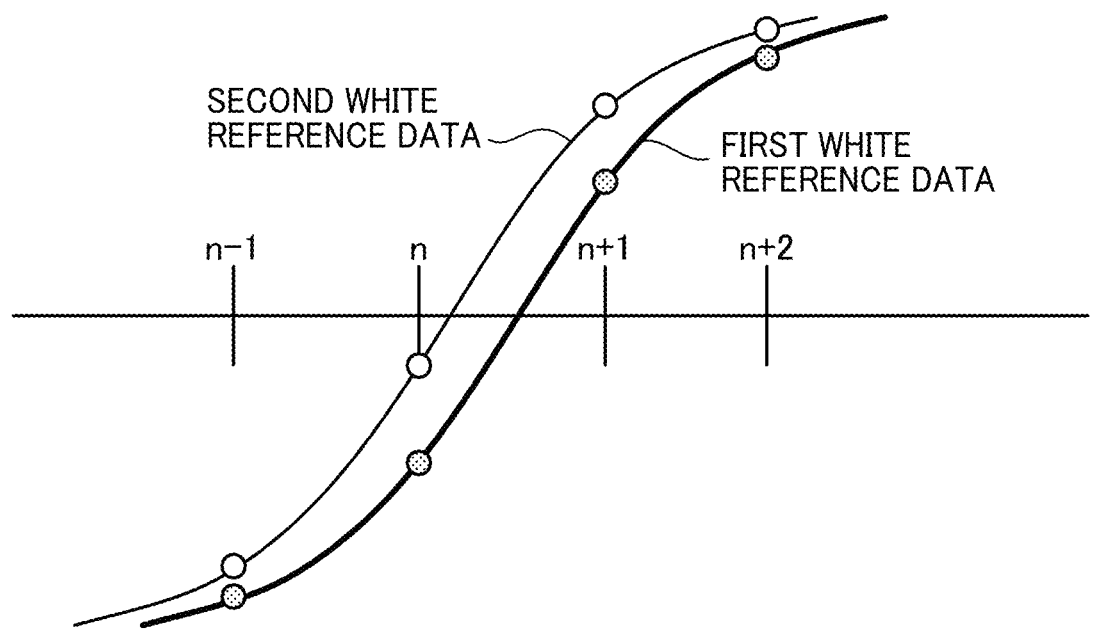
FIGS. 6A and 6B are graphs illustrating an intersection point calculation process performed by a first reference level intersection point calculator and a second reference level intersection point calculator included in the white correction circuit of the first embodiment.
Figure 6B:
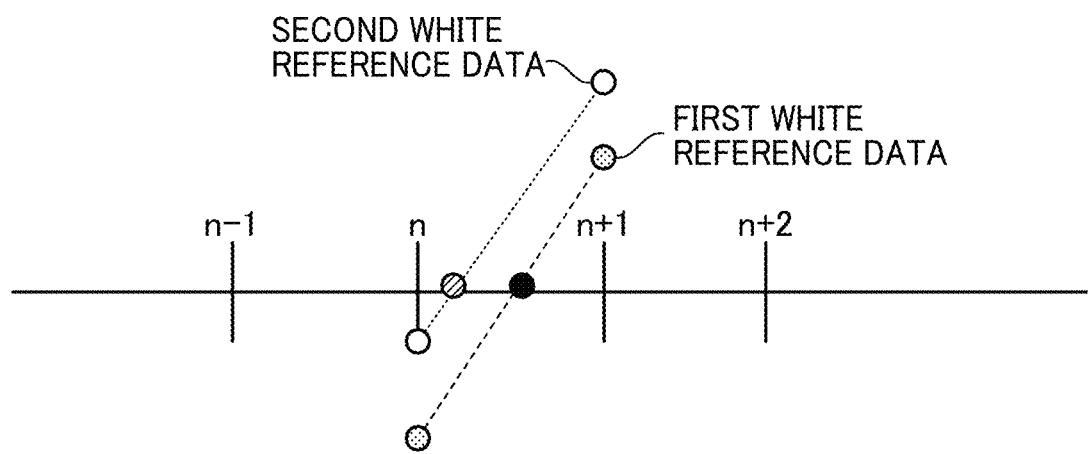

FIGS. 6A and 6B are graphs illustrating an intersection point calculation process performed by the first reference level intersection point calculator 305 and the second reference level intersection point calculator 306. FIG. 6A illustrates the phase difference between the first periodic component and the second periodic component at a certain position in the main scanning direction. FIG. 6B illustrates a calculation for approximating the phase difference.

As illustrated in FIG. 6A, the first periodic component and the second periodic component are both representable as a sine wave pattern in the main scanning direction. The first reference level intersection point calculator 305 and the second reference level intersection point calculator 306 approximate the segment between pixels including the intersection point of the sine wave pattern and the predetermined output level as a straight line, as illustrated in FIG. 6B, and calculate the intersection point of the approximated straight line and the reference level. In the present example, the reference level corresponds to the line representing the zero output level, i.e., the zero light amount level. Herein, two pixels between which the positive and negative signs of the output level are reversed (i.e., the n-th pixel and the (n+1)-th pixel) are determined, and the sine wave pattern between the two pixels is approximated as a straight line. Then, the intersection point of the approximated straight line and the reference level (i.e., the straight line representing the zero light amount level) is calculated.

Specifically, when the respective brightness levels of the n-th pixel and the (n+1)-th pixel in the first periodic component are represented as Y1n and Y1n+1, respectively, the value of a pixel X1 at the point corresponding to the zero light amount level is calculated with equation (1) given below.

$$X1=(n \times Y1n+1-(n+1) \times Y1n)/(Y1n+1-Y1n) \quad (1)$$

Similarly, when the respective brightness levels of the n-th pixel and the (n+1)-th pixel in the second periodic component are represented as Y2n and Y2n+1, respectively, the value of a pixel X2 at the point corresponding to the zero light amount level is calculated with equation (2) given below.

$$X2=(n \times Y2n+1-(n+1) \times Y2n)/(Y2n+1-Y2n) \quad (2)$$

Then, based on the difference between the first intersection point and the second intersection point, the phase difference calculator 307 calculates the phase difference between the first periodic component and the second periodic component. Specifically, the phase difference calculator 307 substitutes the values of the first periodic component and the second periodic component obtained with equations (1) and (2) into equation (3) given below, to thereby calculate a phase difference ΔX.

$$\Delta X = X1 - X2 \quad (3)$$

The phase difference calculator 307 further discretizes the calculated phase difference ΔX with multiple predetermined phase shift amounts. For example, with 32 phase shift amounts, the phase difference calculator 307 discretizes the phase difference ΔX into −15/32 pixel, −14/32 pixel, . . . , 15/32 pixel, and 16/32 pixel.

FIG. 7A is a graph illustrating the distribution in the main scanning direction of the detected phase difference. FIG. 7B is a graph illustrating the result of discretizing the distribution in the main scanning direction of the phase difference with 32 phase shift amounts. The phase shifter 308 shifts the phase of the first periodic component with the result of discretization performed by the phase difference calculator 307.

Figure 8:
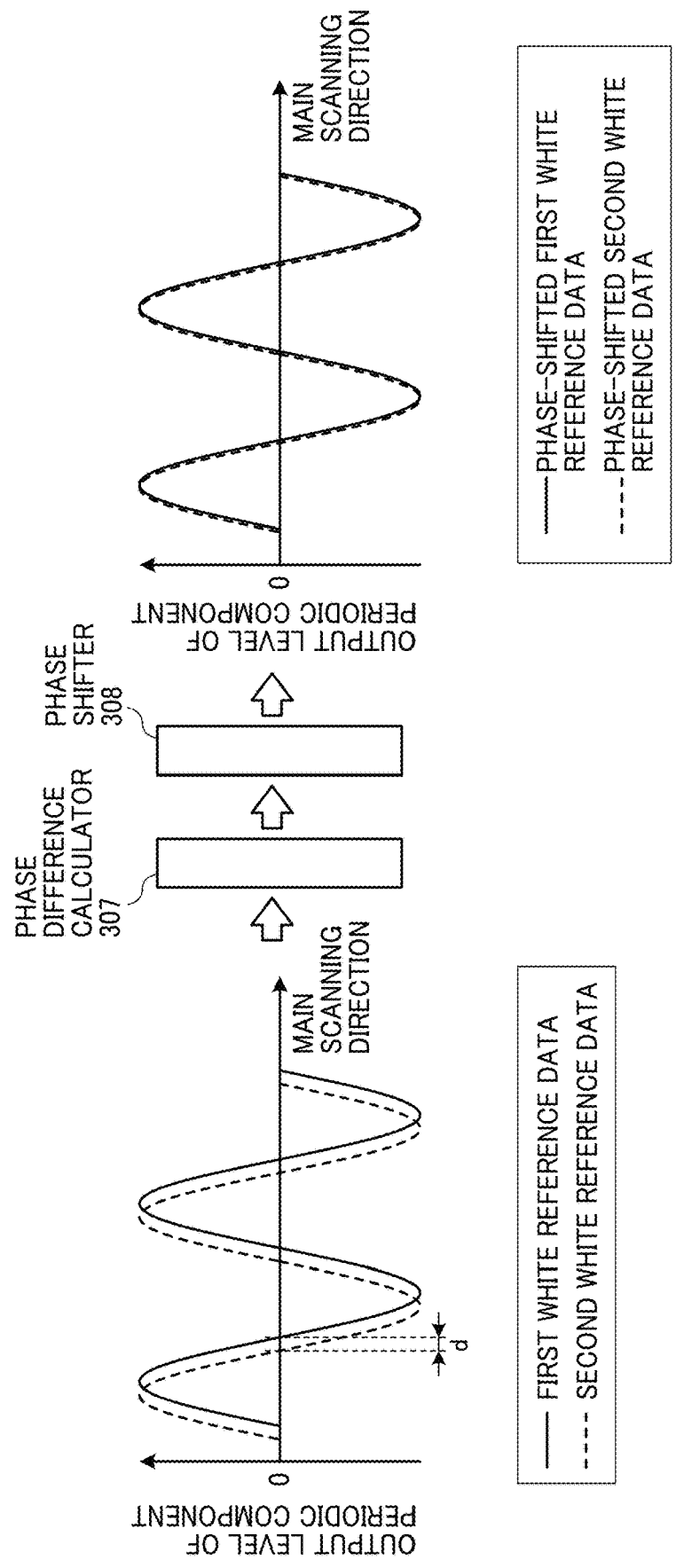
FIG. 8 is a diagram illustrating a phase shift of a periodic component in the first embodiment.

FIG. 8 is a diagram illustrating the phase shift of the periodic component. The phase difference calculator 307 calculates a phase difference d, and the phase shifter 308 shifts the phase of the first periodic component of the first white reference data leftward by the phase difference d. The phase shift within one pixel or less is calculated with a cubic correction operation.

Figure 9A:
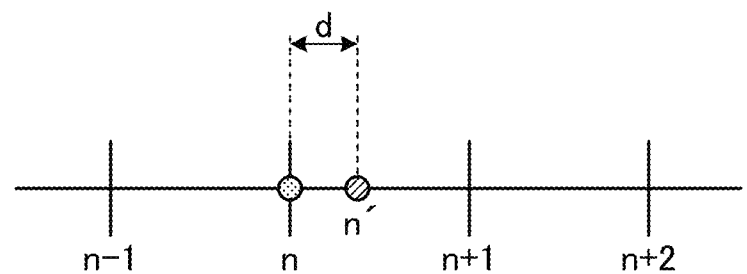
FIGS. 9A and 9B are diagrams illustrating the relationship between a target pixel and surrounding pixels in a cubic correction operation in the first embodiment.
Figure 9B:
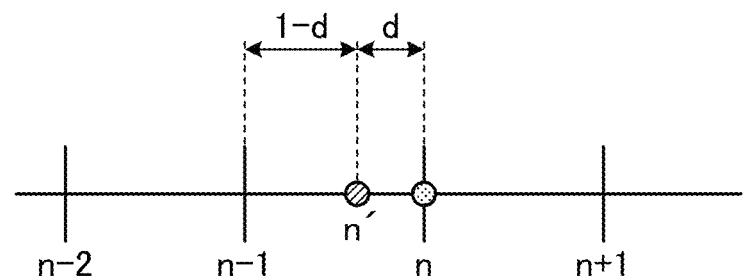

FIGS. 9A and 9B are diagrams illustrating the relationship between a target pixel and surrounding pixels in the cubic correction operation. In the cubic correction operation, the n-th pixel in the main scanning direction is determined as the target pixel, and the value (i.e., the image data) at the position of the target pixel shifted by the shift amount corresponding to the phase difference d is calculated with the data of four pixels in front of and behind the target pixel.

The phase shifter 308 selectively performs one of two operations: an operation of delaying the target pixel by moving the target pixel leftward in the main scanning direction (i.e., in the negative direction), as illustrated in FIG. 9A, and an operation of advancing the target pixel by moving the target pixel rightward in the main scanning direction (i.e., in the positive direction), as illustrated in FIG. 9B. The values of correction parameters for calculating the shift amount (i.e., the phase difference d) vary depending on the value of the shift amount. Herein, each of the values obtained by dividing an inter-pixel interval by 32 is used as the value of the shift amount, for example.

FIG. 10 illustrates an example of the values of the correction parameters for calculating the shift amount (i.e., the phase difference d), in which the inter-pixel interval is divided by 32.

When the value of the n-th pixel is represented as X'(n), the value X'(n) of the n-th pixel delayed, i.e., moved leftward, by the shift amount corresponding to the phase difference d is calculated with equation (4) given below.

$$X'(n)=W1 \times X(n-1)+W2 \times X(n)+W3 \times X(n+1)+W4 \times X(n+2) \quad (4)$$

Further, the value X'(n) of the n-th pixel advanced, i.e., moved rightward, by the shift amount corresponding to the phase difference d is calculated with equation (5) given below.

$$X'(n)=W1\times X(n-2)+W2\times X(n-1)+W3\times X(n)+W4\times X(n+1) \quad (5)$$

The phase shifter 308 thus shifts the phase of the first periodic component.

The corrected data generator 309 adds the smoothed component of the first white reference data to the output data from the phase shifter 308 (i.e., the phase-shifted first periodic component of the first white reference data), to thereby obtain corrected white data corresponding to the corrected shading data.

Figure 11:
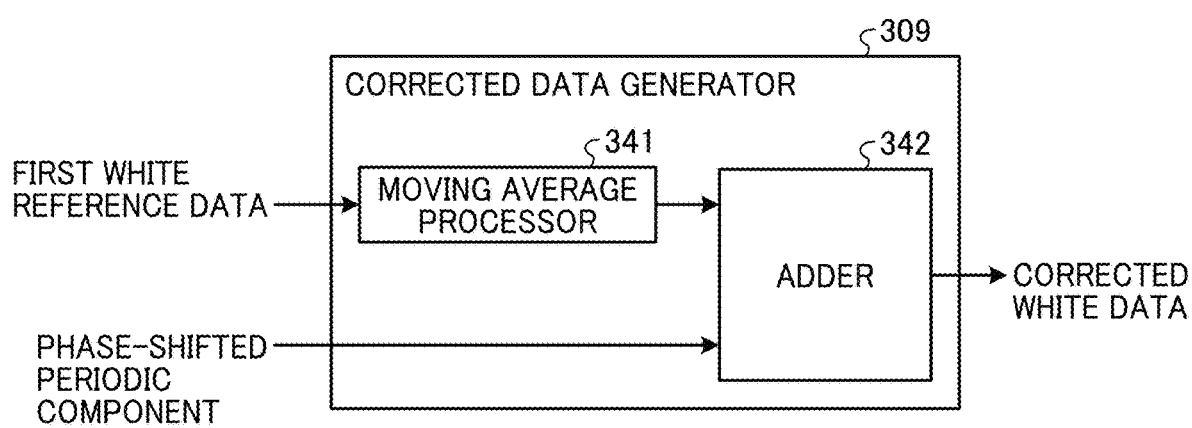
FIG. 11 is a diagram illustrating an exemplary configuration of functional blocks of a corrected data generator included in the white correction circuit of the first embodiment.

FIG. 11 is a diagram illustrating an exemplary configuration of functional blocks of the corrected data generator 309. As illustrated in FIG. 11, the corrected data generator 309 includes a moving average processor 341 and an adder 342. The moving average processor 341 smooths the first periodic component of the first white reference data with the moving average. The adder 342 adds the smoothed data output from the moving average processor 341 to the output data from the phase shifter 308, and outputs the added data as the corrected white data. The configuration for generating the corrected white data is not limited to the above-described example, and may be designed as appropriate.

The shading corrector 310 performs the shading correction on the input image data by using the corrected white data obtained from the corrected data generator 309 as the shading data.

As described above, in the present embodiment, the phase shift of the first periodic component is detected from the data of the fixed white plate read immediately before the document reading (i.e., the second white reference data), and the phase shift is corrected. Therefore, accurate white correction is performed even if the phase shift occurs in the first periodic component owing to the difference in the ambient temperature between the time of obtaining the first white reference data and the time of obtaining the second white reference data. Further, the phase difference is calculated from the first intersection point of the first periodic component and the reference level and the second intersection point of the second periodic component and the reference level, and the phase shift within one pixel is performed with a predetermined shift amount. Consequently, the increase in the circuit size is suppressed, leading to a reduction in the circuit size.

Further, the first periodic component extractor 303 includes the smoother 331 and the subtractor 332, as illustrated in FIG. 4, to subtract the smoothed data from the first white reference data. With the reference brightness level set to zero, therefore, the first intersection point of the first periodic component and the second intersection point of the second periodic component are calculated irrespective of the characteristics of the reading module 5 (i.e., the reading device).

Among the above-described circuit blocks of the present embodiment, later-stage functions including the black correction circuit 204 may be implemented by hardware. Alternatively, all or part of the functions may be implemented by software. For example, programs corresponding to the functions may be stored in a memory such as a hard disk drive (HDD), a read only memory (ROM), or a random access memory (RAM) and executed by a central processing unit (CPU) to implement the functions with software.

Further, the corresponding programs may be provided as recorded on a computer readable recording medium such as a compact disc (CD)-ROM or a flexible disk (FD) in an installable or executable file format. Further, the programs may be provided as recorded on a computer readable recording medium such as a CD-recordable (CD-R), a digital versatile disc (DVD), a Blu-ray disc (registered trademark), or a semiconductor memory. Further, the programs may be provided as installed in the reading device via a network such as the Internet, or may be provided as previously stored in a memory of the reading device such as a ROM.

Although the above description of the present embodiment has been given of an example in which the shading correction device is applied to the reading device, a shading correction device with the function of performing the shading correction may be provided independently to be used in combination with a reading device or another device. For example, all or part of the first memory 301, the second memory 302, the first periodic component extractor 303, the second periodic component extractor 304, the first reference level intersection point calculator 305, the second reference level intersection point calculator 306, the phase difference calculator 307, the phase shifter 308, the corrected data generator 309, and the shading corrector 310 illustrated in FIG. 3 may be provided as a shading correction device and mounted in a reading device or an image forming apparatus.

A first modified example of the first embodiment will be described.

In the first modified example of the first embodiment described below, the value at the position of the smear is replaced with another value.

Figure 12:
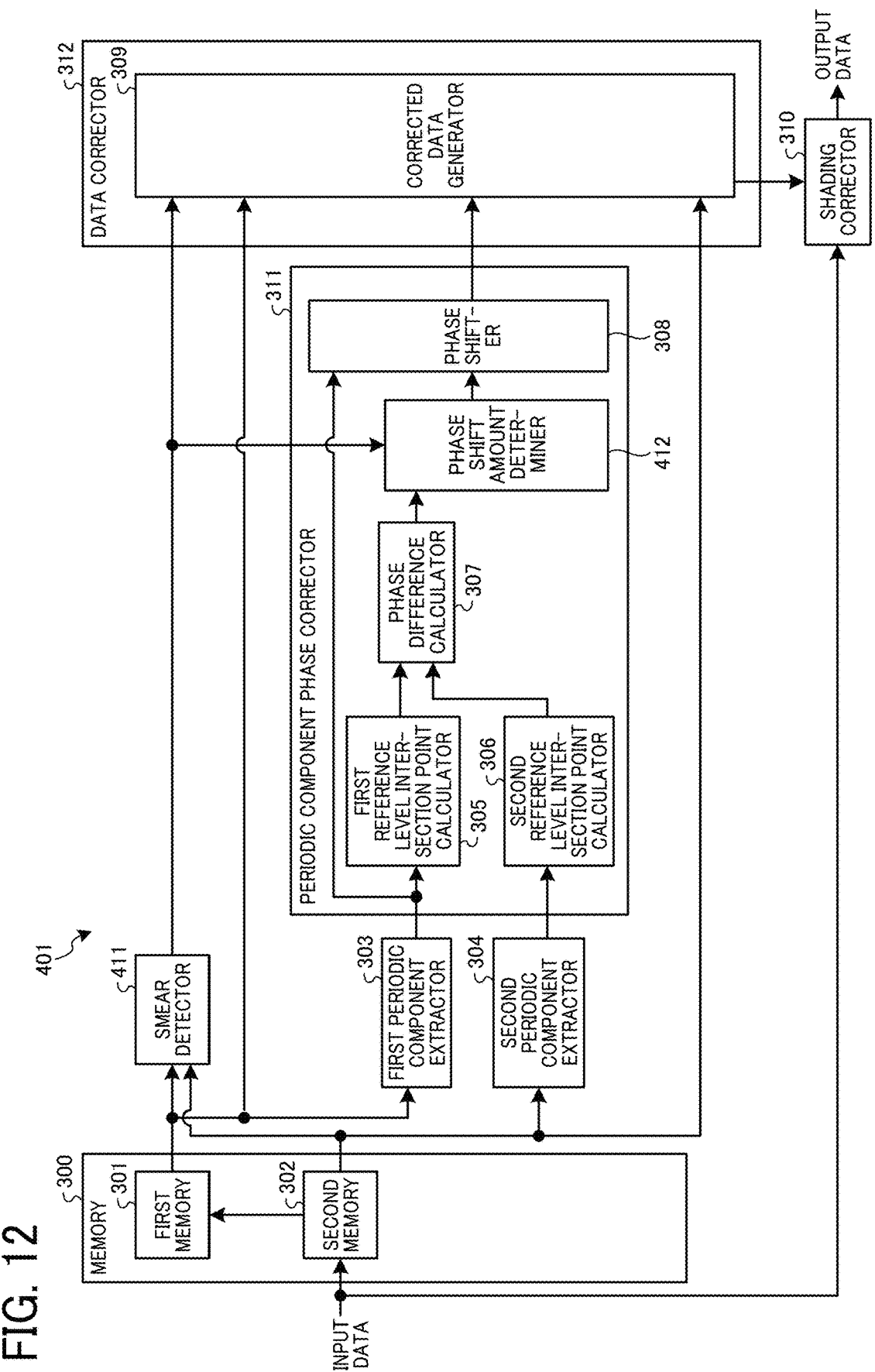
FIG. 12 is a diagram illustrating an exemplary configuration of functional blocks of a white correction circuit according to a first modified example of the first embodiment.
Figure 13A:
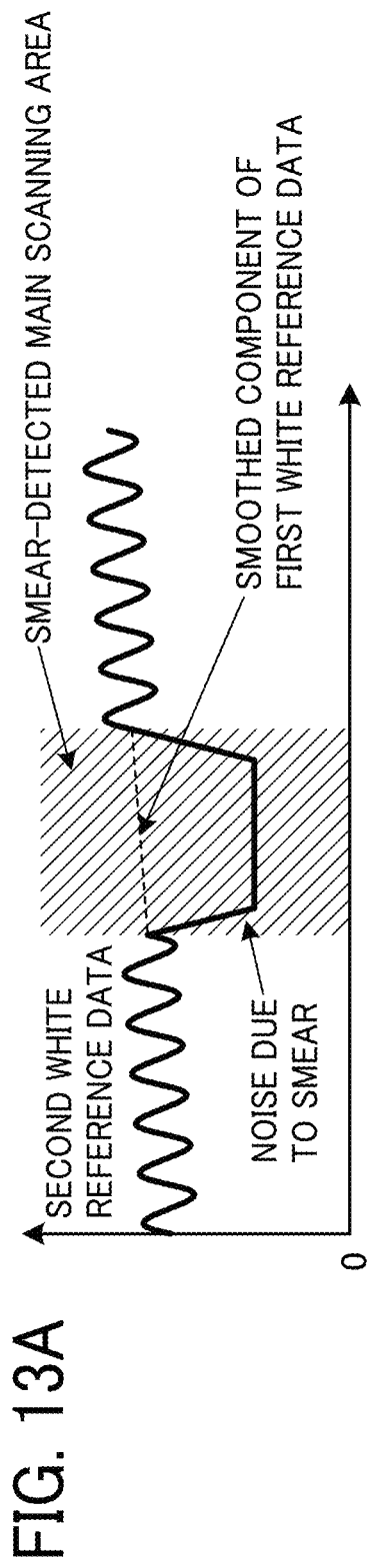
FIGS. 13A, 13B, and 13C are graphs illustrating the replacement of the value at the position of a smear in the first modified example of the first embodiment.
Figure 13B:
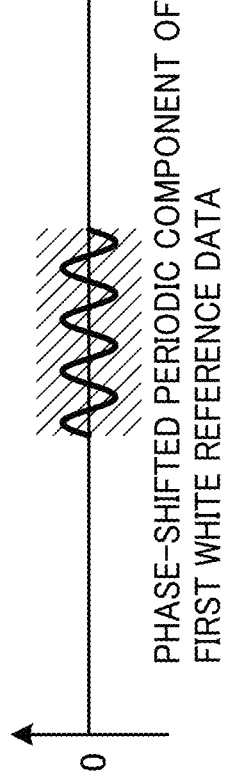
Figure 13C:
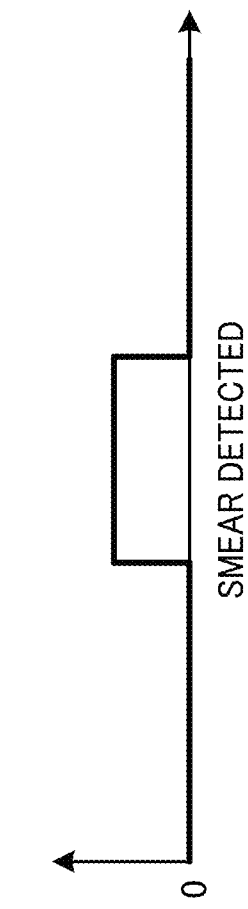

FIG. 12 is a diagram illustrating an exemplary configuration of functional blocks of a white correction circuit according to the first modified example of the first embodiment. FIGS. 13A, 13B, and 13C are graphs illustrating the replacement of the value at the position of the smear with another value. A white correction circuit 401 illustrated in FIG. 12 includes a smear detector 411 and a phase shift amount determiner 412 in addition to the components of the white correction circuit 205 of the first embodiment (see FIG. 3).

The smear detector 411 determines the anomaly of the data based on whether the ratio between the first white reference data in the first memory 301 and the second white reference data in the second memory 302 is equal to or less than a predetermined threshold value. If the anomaly of the data is detected, the smear detector 411 outputs the data of the position in the main scanning direction of the anomaly of the data as the data representing the position of the smear, as illustrated in FIG. 13C.

Based on the phase shift amount at the position of the smear, the phase shift amount determiner 412 determines the respective phase shift amounts of the first white reference data and the second white reference data at the position in the main scanning direction, and outputs the determined phase shift amounts to the phase shifter 308.

The phase shifter 308 corrects the phase at the position of the smear, and outputs the corrected data to the corrected data generator 309.

In this correction, the smoothed component of the first white reference data and the phase-shifted first periodic component of the first white reference data are combined at the position corresponding to the smear-detected portion of the second white reference data, as illustrated in FIGS. 13A and 13B.

In the first modified example, the phase shift is not corrected in the entire main scanning area; the replacement with the first white reference data is limited to the position corresponding to the anomalous portion of the second white reference data. Thereby, the robustness of the correction is improved.

A second modified example of the first embodiment will be described.

The second modified example of the first embodiment described below is designed to improve the accuracy of the detection. The distribution in the main scanning direction of the phase difference calculated by the phase difference calculator 307 contains noise due to local fluctuations at the boundaries between sensors and fine dust on the fixed white plate, for example. If the distribution in the main scanning direction of the phase difference with this noise is discretized with the predetermined shift amount, the detection error may be increased. To prevent such an increase in the error, boundary processing may be executed. In the second modified example, the distribution in the main scanning direction of the phase difference is averaged in blocks as an example of the boundary processing. Specifically, in the second modified example, the phase shift amount determiner 412 first divides the component in the main scanning direction (hereinafter referred to as the main scanning component) of the phase difference into blocks of a predetermined number of pixels, and averages the main scanning component in blocks to smooth the noise. The phase shift amount determiner 412 then discretizes the main scanning component based on the averaged values.

Figure 14A:
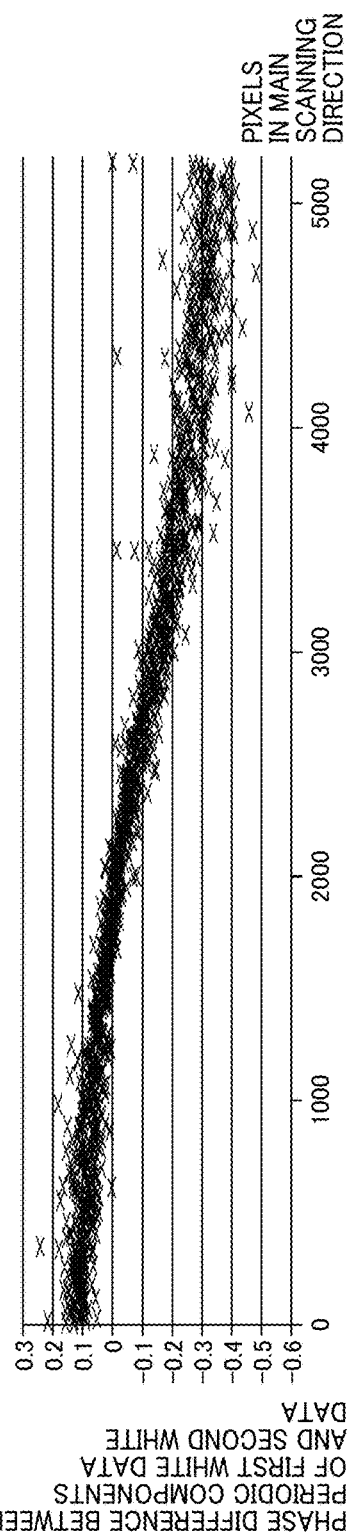
FIGS. 14A, 14B, and 14C are graphs illustrating an example of a phase shift amount determination process according to a second modified example of the first embodiment.
Figure 14B:
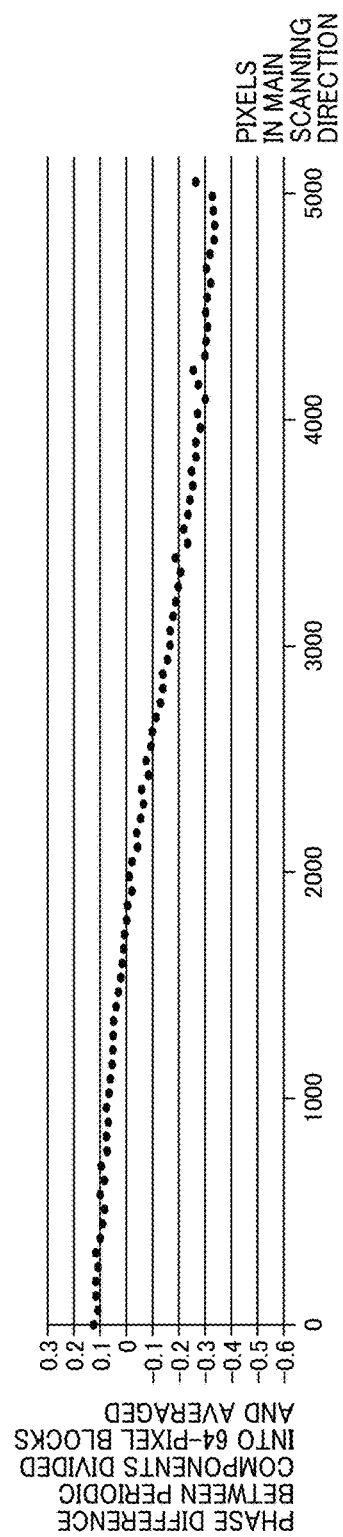
Figure 14C:
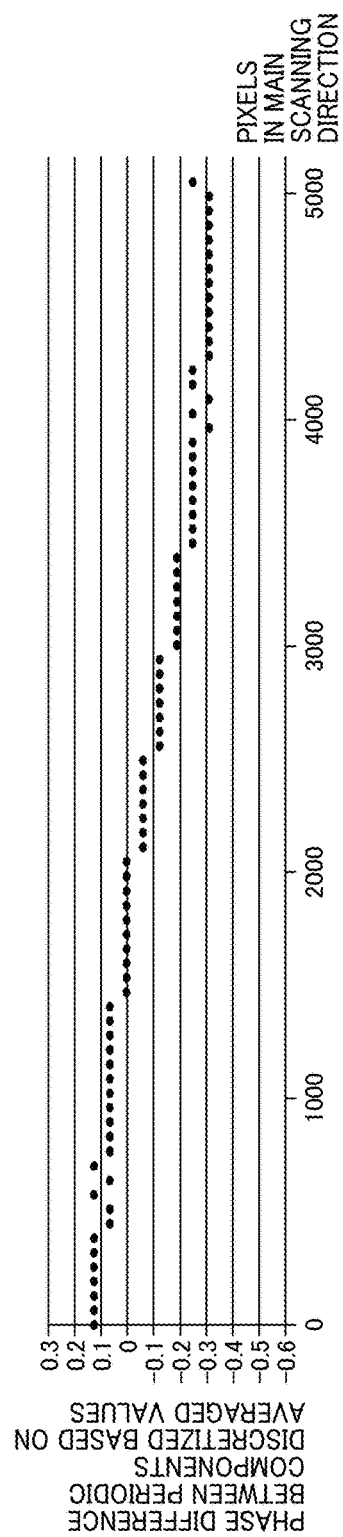

FIGS. 14A, 14B, and 14C are graphs illustrating an example of a phase shift amount determination process according to the second modified example of the first embodiment. FIG. 14A illustrates the distribution in the main scanning direction of the detected phase difference. FIG. 14B illustrates the distribution in the main scanning direction of the phase difference divided into blocks of 64 pixels and averaged by the phase shift amount determiner 412. FIG. 14C illustrates the distribution in the main scanning direction of the phase difference discretized based on the averaged values by the phase shift amount determiner 412.

A third modified example of the first embodiment will be described.

In the third modified example of the first embodiment described below, another example of the boundary processing is executed. The phase difference has a curved distribution in the main scanning direction. Due to the characteristics of the reading module 5 including a plurality of sensors mounted on a substrate, local fluctuations occur in the periodic component at the boundaries between the sensors, causing possible local changes in the phase difference of the periodic component at the boundaries between the sensors. In the third modified example, therefore, the pixel areas in the main scanning direction corresponding to the local changes are excluded from the discretization process to avoid the influence of the local changes.

Figure 15:
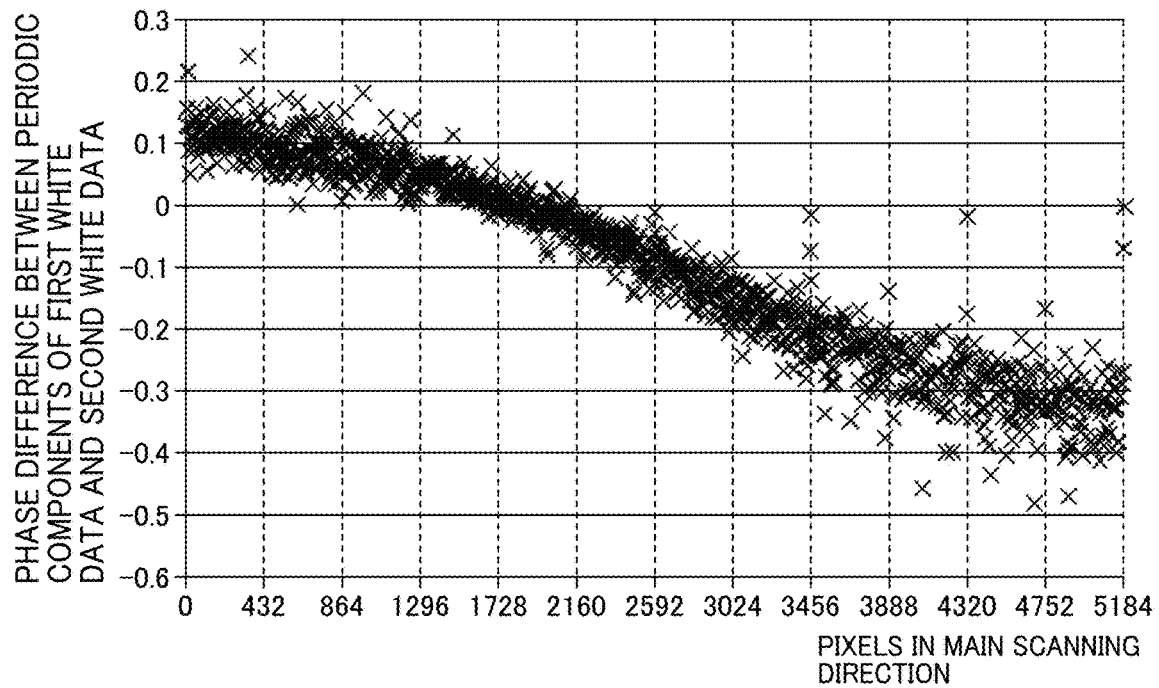
FIG. 15 is a graph illustrating the distribution in the main scanning direction of the phase difference in a third modified example of the first embodiment.

FIG. 15 is a graph illustrating the distribution in the main scanning direction of the phase difference. In FIG. 15, the boundaries between the sensors are indicated by vertical broken lines. The local changes in the phase difference may occur at the positions corresponding to the boundaries between the sensors. In the example illustrated in FIG. 15, the boundary between sensors appears at every 432-nd pixel. The pixel areas in the main scanning direction corresponding to the local changes are identified based on the characteristics of the reading module 5. Before the execution of the discretization process by the phase difference calculator 307, therefore, the pixel areas in the main scanning direction corresponding to the local changes are excluded from the discretization process. Thereby, the influence of the local changes is avoided, further improving the detection accuracy.

A fourth modified example of the first embodiment will be described.

In the fourth modified example of the first embodiment described below, still another example of the boundary processing is executed. The unprocessed data of the phase difference contains the noise due to the local fluctuations at the boundaries between the sensors and the fine dust on the fixed white plate, for example. Therefore, fitting with a polynomial is performed on the data of the distribution in the main scanning direction of the phase difference, and the discretization process is performed based on the polynomial.

Figure 16:
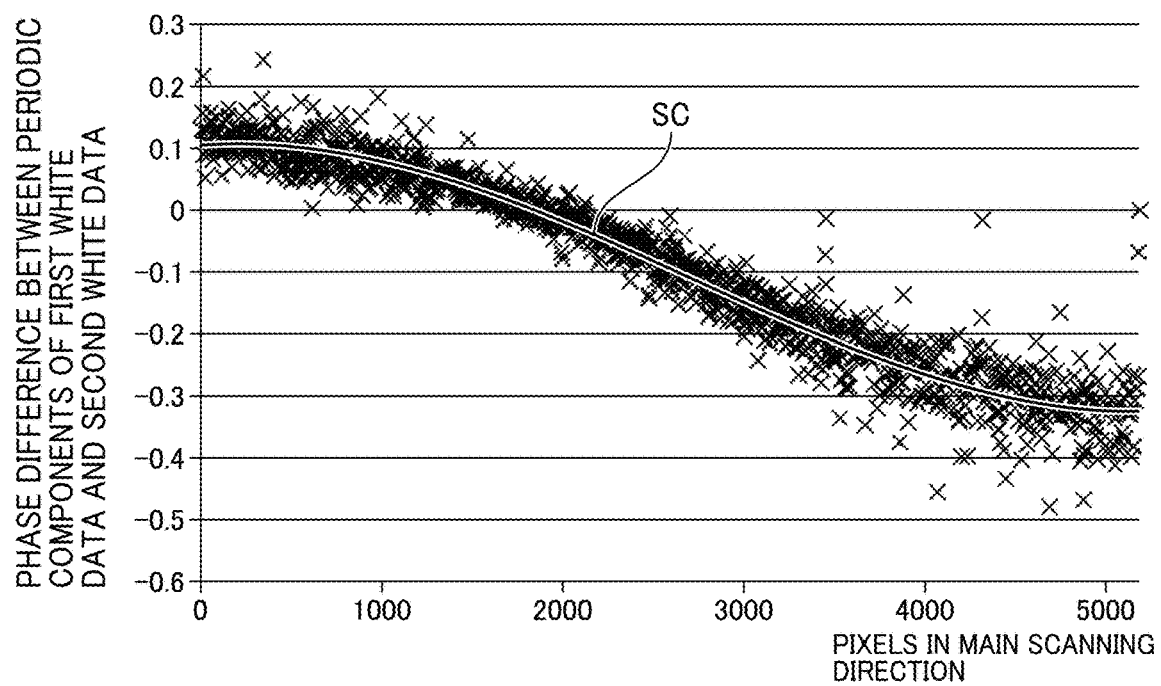
FIG. 16 is a graph illustrating an example of fitting with a polynomial performed on the data of the distribution in the main scanning direction of the phase difference in a fourth modified example of the first embodiment.

FIG. 16 is a graph illustrating an example of fitting with a polynomial performed on the data of the distribution in the main scanning direction of the phase difference. In FIG. 16, a solid curve SC represents the result of least squares approximation with a cubic function performed on the data. With this polynomial fitting, the influence of the local changes due to the noise is avoided.

A fifth modified example of the first embodiment will be described.

The fifth modified example of the first embodiment described below is designed to improve the accuracy of the smear detection. When the smear detector 411 (see FIG. 12) detects a smear in a certain block, the phase shift amount determiner 412 (see FIG. 12) extracts the phase shift amount of the block from the output of the phase difference calculator 307, and outputs the extracted phase shift amount. If a part of the output of the phase difference calculator 307 corresponding to the block is affected by the smear, a value deviated from the correct phase shift amount of the block may be output. In the fifth modified example, therefore, the phase shift amount determiner 412 interpolates the phase shift amount of the block with the smear based on the phase shift amounts of blocks in front of and behind the block.

Figure 17A:
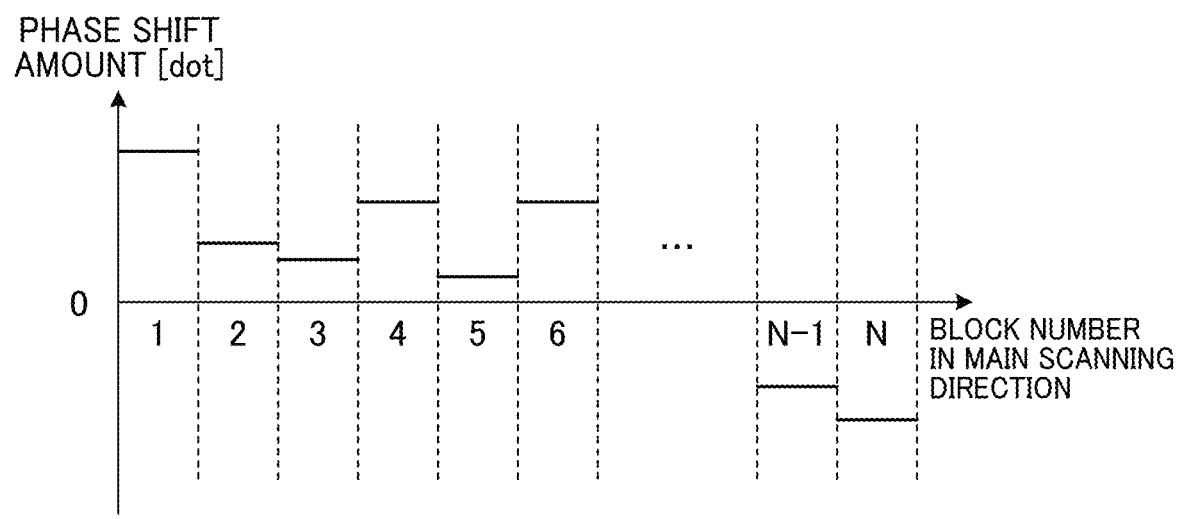
FIGS. 17A and 17B are graphs illustrating interpolation of a phase shift amount in a fifth modified example of the first embodiment.
Figure 17B:
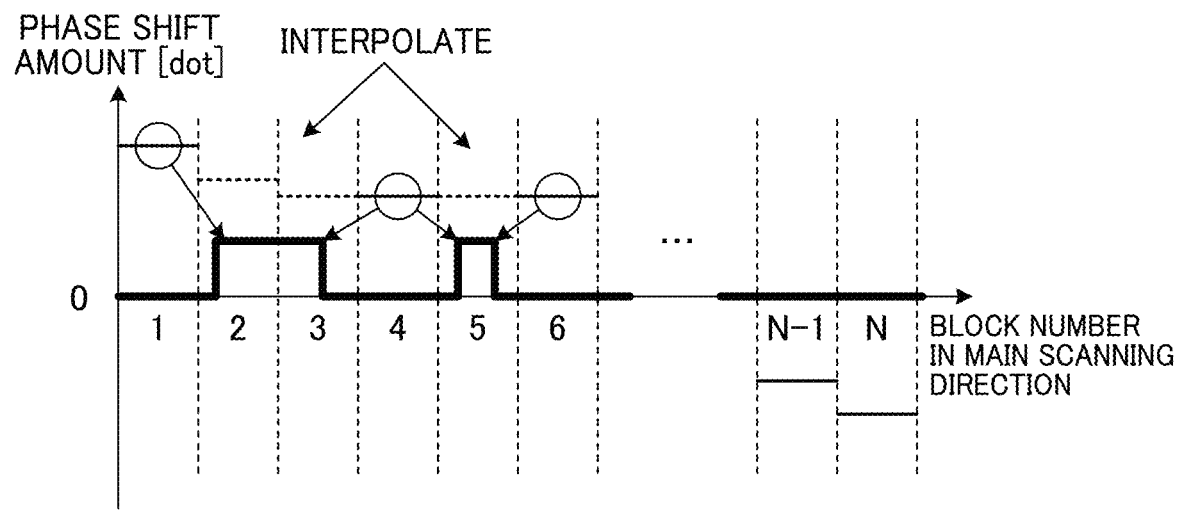

FIGS. 17A and 17B are graphs illustrating the interpolation of the phase shift amount. As illustrated in FIG. 17A, it is assumed here that the phase shift amount has been calculated, and that the second, third, and fifth blocks have been determined to include anomalous pixels. It is considered in this case that the phase shift amount is affected by the smear in each of the second, third, and fifth blocks. Therefore, the phase shift amount of the block is interpolated based on the phase shift amounts of pixels in front of and behind the block. Specifically, as illustrated in FIG. 17B, the phase shift amount of the second block and the phase shift amount of the third block are linear interpolated based on the phase shift amount of the first block and the phase shift amount of the fourth block. Further, the phase shift amount of the fifth block is linear interpolated based on the phase shift amount of the fourth block and the phase shift amount of the sixth block.

A sixth modified example of the first embodiment will be described.

The first white reference data and the second white reference data may be different in the amplitude of the periodic component and the overall light amount level owing to the difference in the temperature of the environment for acquiring the data or the change in the characteristics of the light source, for example, causing a possible error in the correction. The sixth modified example described below is designed to correct this error.

Figure 18:
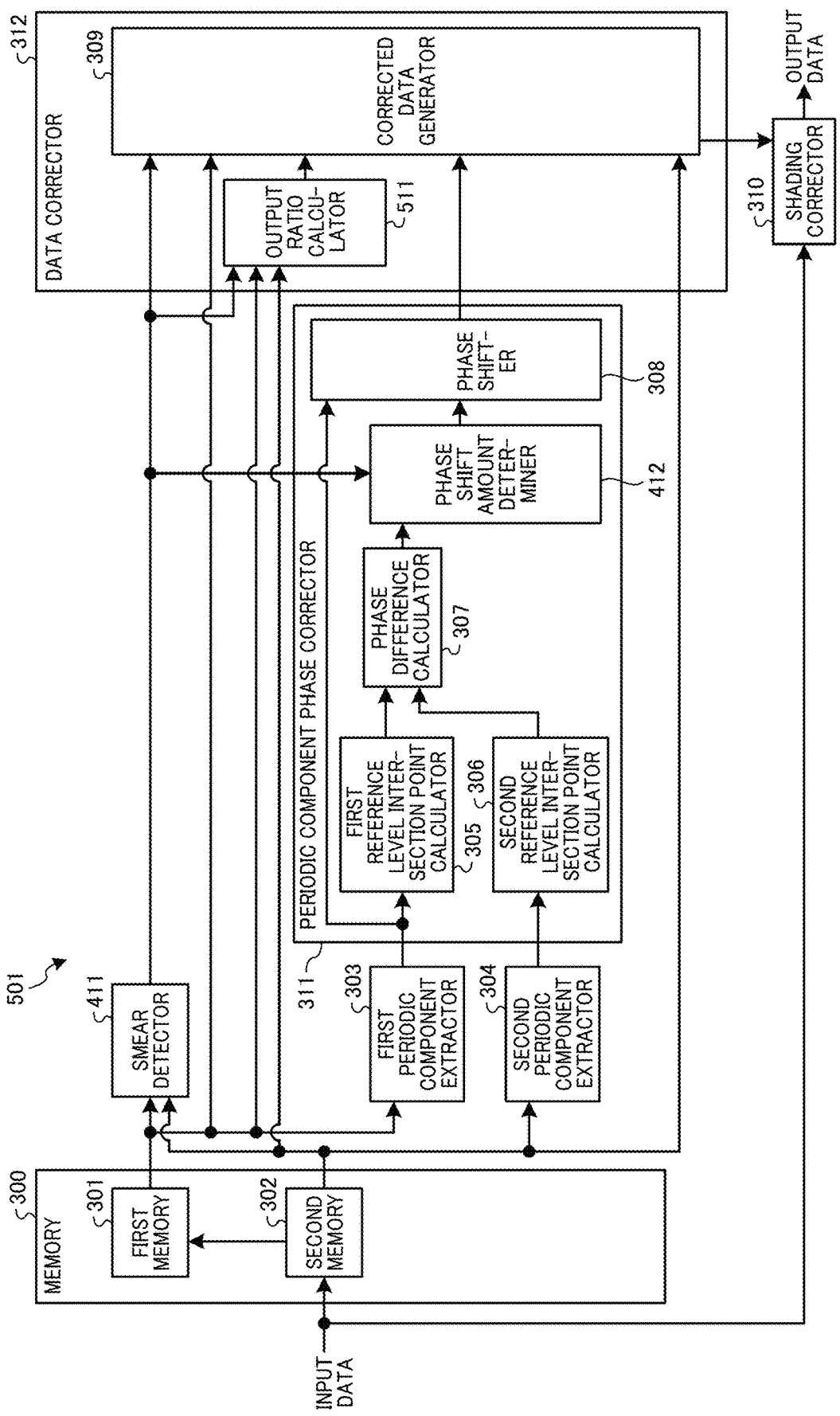
FIG. 18 is a diagram illustrating an exemplary configuration of functional blocks of a white correction circuit according to a sixth modified example of the first embodiment.

FIG. 18 is a diagram illustrating an exemplary configuration of functional blocks of a white correction circuit according to the sixth modified example of the first embodiment. A white correction circuit 501 illustrated in FIG. 18 includes an output ratio calculator 511 in addition to the components of the white correction circuit 401 according to the first modified example of the first embodiment (see FIG. 12).

Figure 19A:
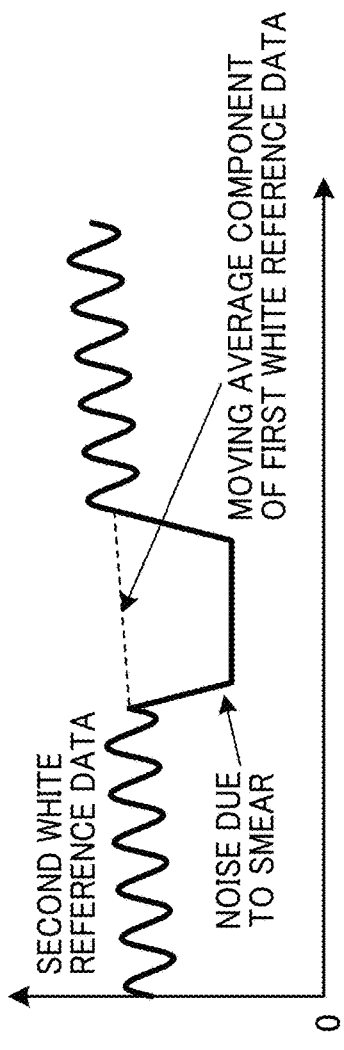
FIGS. 19A, 19B, and 19C are graphs illustrating an output ratio calculator included in the white correction circuit of the sixth modified example of the first embodiment.
Figure 19B:
Figure 19C:
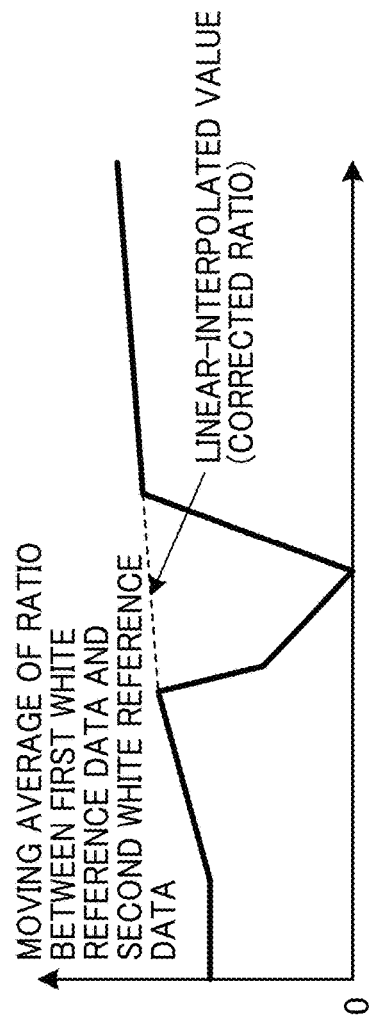

FIGS. 19A, 19B, and 19C are graphs illustrating the output ratio calculator 511. If the first white reference data and the second white reference data are different in the level of the light amount owing to the difference in the temperature of the environment for acquiring the data or the change in the characteristics of the light source, for example, an error may occur in the correction. To correct this error, the ratio between the first white reference data and the second white reference data is taken into consideration. If the first white reference data contains noise due to a smear, the ratio between the first white reference data and the second white reference data drops in the area corresponding to the noise as compared to neighboring areas, as illustrated in FIG. 19C. To eliminate the noise component, the moving average of the ratio between the first white reference data and the second white reference data is calculated, and the portion of the moving average corresponding to the noise is linear interpolated. Then, the thus-interpolated value is determined as a corrected ratio, and the above-described corrected white data (i.e., the combination of the moving average component of the first white reference data in FIG. 19A and the phase-shifted first periodic component of the first white reference data in FIG. 19B) is multiplied by the corrected ratio. Thereby, appropriate correction is performed despite the difference in the level of the light amount between the first white reference data and the second white reference data.

A second embodiment of the present invention will be described.

A description will be given of an exemplary configuration of an image forming apparatus according to the second embodiment. The following description will be given of a configuration of a multifunction peripheral (MFP) as an example of an image forming apparatus including an image reading device and an image forming device.

Figure 20:
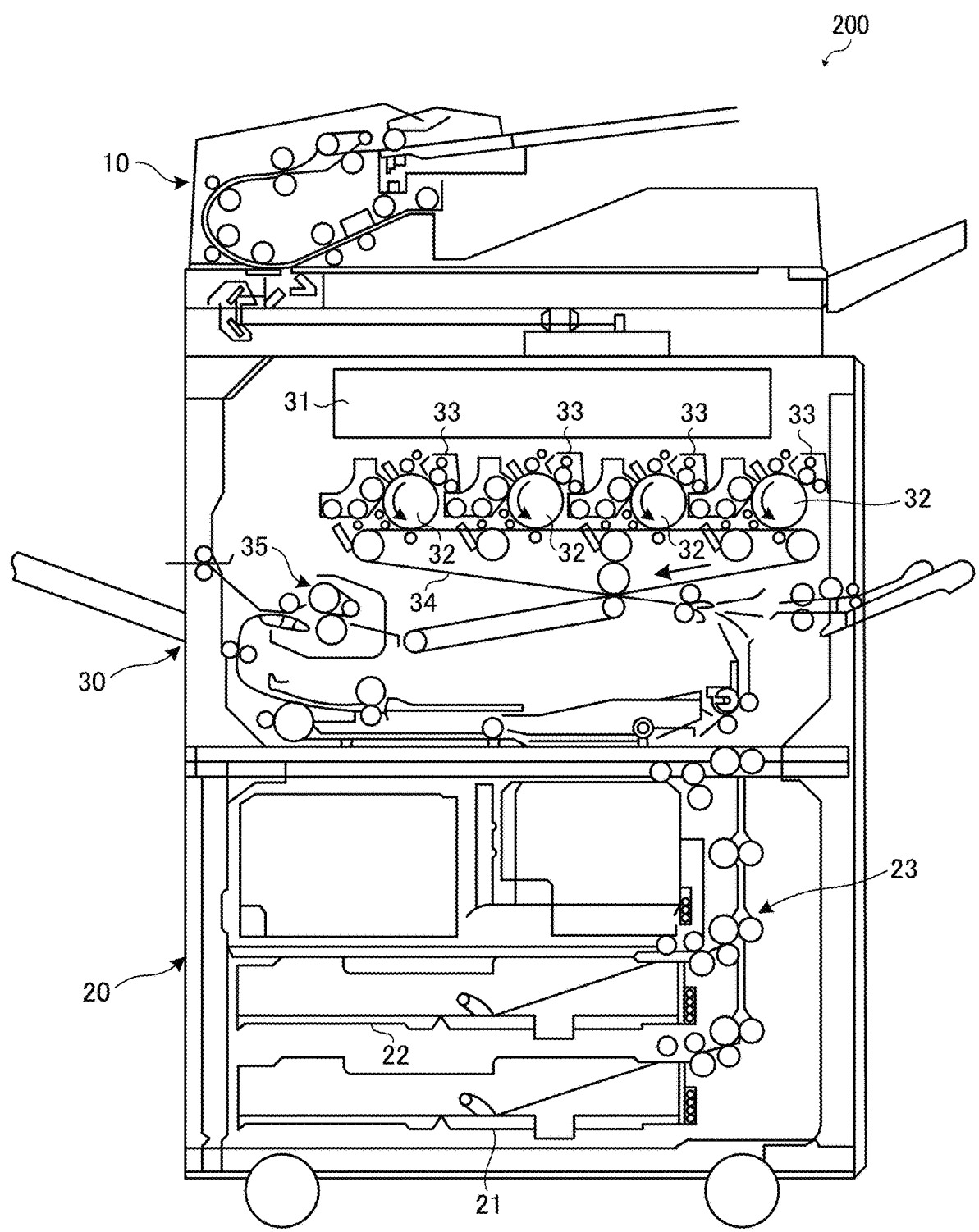
FIG. 20 is a diagram illustrating an exemplary general arrangement of a multifunction peripheral (MFP) according to a second embodiment of the present invention.
Figure 21:
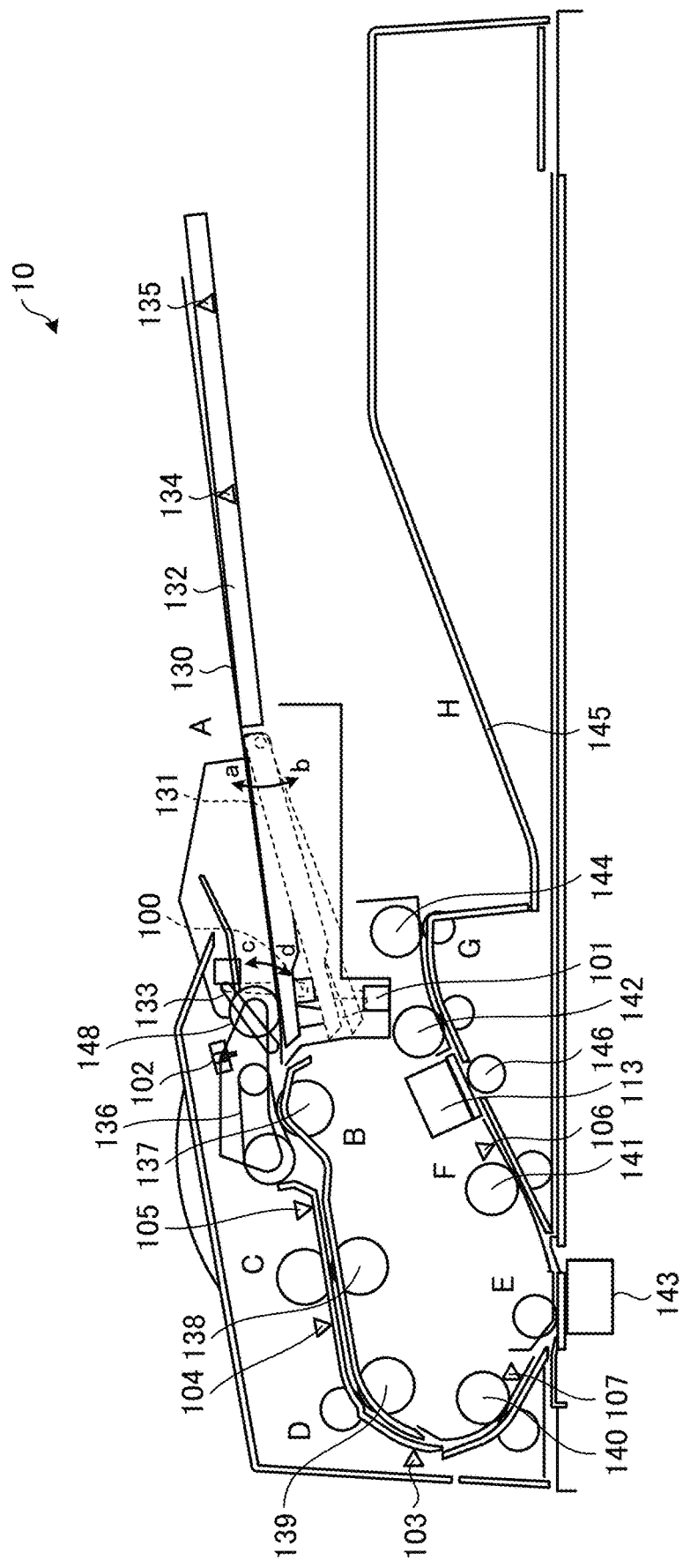
FIG. 21 is a diagram illustrating an example of an automatic document feeder (ADF) included in the MFP of the second embodiment.
Figure 22:
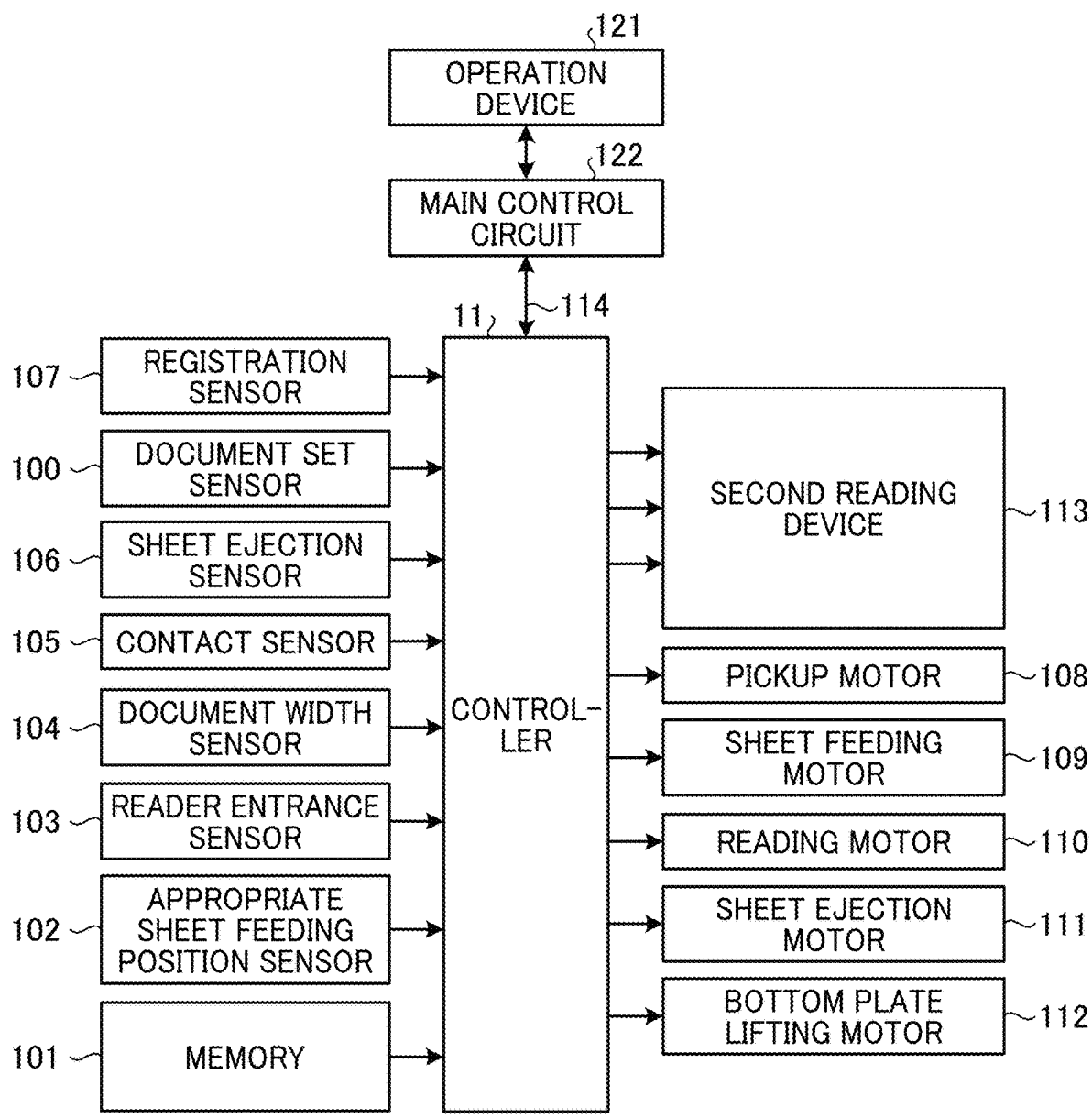
FIG. 22 is a diagram illustrating an exemplary configuration of control blocks of the MFP of the second embodiment.

FIG. 20 is a diagram illustrating an exemplary general arrangement of an MFP 200 according to the second embodiment. FIG. 21 is a diagram illustrating an example of an automatic document feeder (ADF) included in the MFP 200. FIGS. 20 and 21 illustrate the MFP 200 and the ADF, respectively, as viewed with an external protection cover of the MFP 200 removed therefrom for better understanding of the internal configuration of the MFP 200. FIG. 22 is a diagram illustrating an exemplary configuration of control blocks of the MFP 200.

The MFP 200 illustrated in FIG. 20 includes an image reading device 10, a sheet feeding device 20, and an image forming device 30. The sheet feeding device 20 includes sheet feeding cassettes 21 and 22 that store recording sheets of difference sizes. The sheet feeding device 20 further includes a sheet feeding mechanism 23 including various rollers for transporting the recording sheets stored in the sheet feeding cassettes 21 and 22 to an image forming position in the image forming device 30.

The image forming device 30 includes an exposure device 31, photoconductor drums 32, developing devices 33, a transfer belt 34, and a fixing device 35. In the image forming device 30, the exposure device 31 exposes the photoconductor drums 32 with light based on image data of a document read by the image reading device 10, to thereby form latent images on the photoconductor drums 32. Further, in the image forming device 30, the developing devices 33 supply toners of different colors to the photoconductor drums 32, to thereby develop the latent images on the photoconductor drums 32 into toner images. Then, in the image forming device 30, the transfer belt 34 transfers the toner images developed on the photoconductor drums 32 onto one of the recording sheets supplied from the sheet feeding device 20, to thereby form a color image on the recording sheet (i.e., a medium). Then, the fixing device 35 fuses the toners of the toner images transferred to the recording sheet, to thereby fix the color image on the recording sheet.

The image reading device 10 includes the ADF. A document to be read is set on the ADF, and the ADF automatically transports the set document and reads the image of the document at a predetermined position. In FIG. 21, the ADF includes a document setting section A, a separating and feeding section B, a registration section C, a turning section D, a first reading and transporting section E, a second reading and transporting section F, a sheet ejection section G, and a stacking section H. A document stack 130 including documents to be read is set on the document setting section A. The separating and feeding section B separates a document from the other documents of the set document stack 130, and feeds the separated document. The registration section C has a function of causing the fed document to hit against rollers to align the document and a function of pulling out and transporting the aligned document. The turning section D turns over the transported document and transports the document with a document surface (i.e., a surface with the image to be read) thereof facing down to face a reading device. The first reading and transporting section E reads the image on the front surface of the document from under a contact glass. The second reading and transporting section F reads the image on the rear surface of the document after the image on the front surface of the document is read. After the reading of the images on the front and rear surfaces of the document, the sheet ejection section G ejects the document to the outside of the ADF. The stacking section H holds a stack of read documents.

The document stack 130 of the documents to be read is set on a document table 132 including a movable document table 131, with the respective document surfaces of the documents facing up. The document stack 130 is further positioned with side guides so that the width direction of the document stack 130 is aligned perpendicular to a document transport direction. The setting of the documents is detected with a set filler 133 and a document set sensor 100, and a detection signal is transmitted to the main control circuit 122 (see FIGS. 2 and 22) from the document set sensor 100 via an I/F 114 (see FIG. 21).

A surface of the document table 132 is equipped with document length sensors 134 and 135, each of which is a reflective sensor or an actuator-sensor capable of detecting a single document. With the document length sensor 134 or 135, an approximate length of the documents in the document transport direction is detected.

With a bottom plate lifting motor 112 (see FIG. 22), the movable document table 131 is vertically movable in directions a and b indicated by a double-headed arrow in FIG. 21. When the documents set on the movable document table 131 is detected with the set filler 133 and the document set sensor 100, the bottom plate lifting motor 112 is driven forward to lift the movable document table 131 to bring the uppermost surface of the document stack 130 into contact with a pickup roller 148. The pickup roller 148 is moved in directions c and d indicated by a double-headed arrow in FIG. 21 by a cam mechanism including a pickup motor 108 (see FIG. 21) as a drive source. As the movable document table 131 ascends, the uppermost surface of the document stack 130 on the movable document table 131 pushes and lifts the pickup roller 148 in the direction c, and the maximum possible position of the document stack 130 is detected by an appropriate sheet feeding position sensor 102.

When a print key is pressed with an operation device 121 (see FIG. 22) and a document feed signal is transmitted from the main control circuit 122 to the controller 11 via the I/F 114, a sheet feeding motor 109 (see FIG. 22) is rotated forward. Thereby, the pickup roller 148 is driven to rotate and picks up one or more documents (ideally one document) from the document stack 130 on the document table 132. The rotation direction of the pickup roller 148 corresponds to the direction of transporting the uppermost document of the document stack 130 to a sheet feeder entrance.

With the forward rotation of the sheet feeding motor 109, a sheet feeding belt 136 is driven in a sheet feeding direction. Further, with the forward rotation of the sheet feeding motor 109, a reverse roller 137 is driven to rotate in the opposite direction to the sheet feeding direction to separate the uppermost document of the document stack 130 from the remaining documents placed thereunder and transport the separated uppermost document. More specifically, the reverse roller 137 is in contact with the sheet feeding belt 136 with a predetermined pressure. When the reverse roller 137 is in direct contact with the sheet feeding belt 136 or in contact with the sheet feeding belt 136 via a single document, the reverse roller 137 is rotated counterclockwise by the rotation of the sheet feeding belt 136. The drag torque of the reverse roller 137 is set to be lower than the torque of a torque limiter when two or more documents enter between the sheet feeding belt 136 and the reverse roller 137. In this case, the reverse roller 137 rotates clockwise in the original driving direction, to push back any excess document to prevent more than one documents from being transported at one time.

The document separated from the remaining documents by the operation of the sheet feeding belt 136 and the reverse roller 137 is further transported by the sheet feeding belt 136, and the leading end of the document is detected by a contact sensor 105. The document is then further transported and hits against pullout rollers 138. Then, the document is transported by a predetermined distance based on the detection of the contact sensor 105, and is pushed against the pullout rollers 138 such that the document is bent to a predetermined degree. In this state, the sheet feeding motor 109 is stopped to stop driving the sheet feeding belt 136. Further, the pickup motor 108 is rotated to retract the pickup roller 148 from the upper surface of the document to transport the document by the transport force of the sheet feeding belt 136 alone. Thereby, a leading end portion of the document enters the nip between the upper and lower pullout rollers 138 to be aligned (i.e., skew-corrected).

The pullout rollers 138 thus have a skew correction function. The pullout rollers 138 also function to transport the separated and skew-corrected document to intermediate rollers 139. The pullout rollers 138 are driven by the reverse rotation of the sheet feeding motor 109. During the reverse rotation of the sheet feeding motor 109, the pullout rollers 138 and the intermediate rollers 139 are driven, but the pickup roller 148 and the sheet feeding belt 136 are not driven.

A plurality of document width sensors 104 are arranged in the depth direction of the image reading device 10 to detect the size in the width direction of the document transported by the pullout rollers 138, i.e., the size of the document in the direction perpendicular to the document transport direction. The length of the document in the document transport direction is detected based on motor pulses generated in response to detection of the leading end and the rear end of the document with the contact sensor 105.

With the pullout rollers 138 and the intermediate rollers 139 driven, the document is transported from the registration section C to the turning section D. In this transport process, the document transport speed is set to be higher in the registration section C than in the first reading and transporting section E to reduce the processing time in sending the document into the first reading and transporting section E. When the leading end of the document is detected by a reader entrance sensor 103, the document transport speed starts to be reduced before the leading end of the document enters the nip between upper and lower reader entrance rollers 140, to thereby make the document transport speed equal to a reading and transport speed. At the same time, a reading motor 110 (see FIG. 22) is driven forward to drive the reader entrance rollers 140, reader exit rollers 141, and CIS exit rollers 142. When the leading end of the document is detected by a registration sensor 107, the document transport speed is reduced over a predetermined transport distance. The document is then temporarily stopped in front of a first reading device 143, and the registration sensor 107 transmits a registration stop signal to the main control circuit 122 via the I/F 114.

Then, in response to receipt of a reading start signal from the main control circuit 122, the document temporarily stopped for registration starts to be transported again, with the document transport speed being increased to reach a predetermined document transport speed by the time when the leading end of the document arrives at the first reading device 143. When the leading end of the document arrives at the first reading device 143, a gate signal is transmitted to the main control circuit 122. The arrival of the leading end of the document at the first reading device 143 is detected based on the counting of pulses from the reading motor 110. The gate signal, which represents an effective image area in the sub-scanning direction of the first surface of the document, continues to be transmitted to the main control circuit 122 until the rear end of the document passes the first reading device 143.

In one-side document reading, the document passed through the first reading and transporting section E is passed through a second reading device 113 and transported to the sheet ejection section G. In this transport process, in response to detection of the leading end of the document by a sheet ejection sensor 106, a sheet ejection motor 111 (FIG. 22) is driven forward to rotate sheet ejection rollers 144 counterclockwise. Further, based on the counting of pulses from the sheet ejection motor 111 since the detection of the leading end of the document by the sheet discharge sensor 106, the driving speed of the sheet ejection motor 111 is reduced immediately before the rear end of the document passes the nip between the upper and lower sheet ejection rollers 144. When the document is ejected onto a sheet ejection tray 145, therefore, inconvenience of the document jumping out of the sheet ejection tray 145 is prevented.

In two-side document reading, when the leading end of the document arrives at the second reading device 113, the gate signal representing the effective image area in the sub-scanning direction is transmitted to the second reading device 113 from the controller 11. The arrival of the leading end of the document at the second reading device 113 is detected based on the counting of pulses from the reading motor 110 since the detection of the leading end of the document by the sheet ejection sensor 106. The gate signal continues to be transmitted to the second reading device 113 until the rear end of the document passes the second reading device 113. A second reading roller 146 prevents the document from rising from a surface of the second reading device 113. A white plate (i.e., a density reference member) for acquiring the shading data is fixed at a position facing the second reading device 113. A memory 101 stores a program for executing the shading correction.

The second reading device 113 is configured as a CIS for the lack of enough installation space. In the second embodiment, the second reading device 113 is configured as the reading module 5 illustrated in FIGS. 1A and 1B and FIGS. 2 and 3. The second reading device 113 (i.e., the reading module) and a white correction circuit included therein are similar in configuration to the reading module 5 and the white correction circuit 205, 401, or 501 of the first embodiment. The description thereof is therefore redundant and will be omitted here.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. A shading correction device comprising:
a first extractor configured to extract a first periodic component of original shading data, the original shading data being a first reading result obtained through reading a density reference member;
a second extractor configured to extract a second periodic component of a second reading result, the second reading result being obtained through reading the density reference member at a time different from a time of reading the density reference member to obtain the original shading data;
an intersection point calculator configured to calculate a first intersection point of the first periodic component and a reference level and a second intersection point of the second periodic component and the reference level;
a phase shift amount calculator configured to calculate a phase shift amount at each of a plurality of positions based on a difference between the first intersection point and the second intersection point;
a phase shifter configured to shift a phase of the first periodic component based on the calculated phase shift amount at the each of the plurality of positions;
a generator configured to generate corrected shading data including the first periodic component with the shifted phase and the original shading data with the first periodic component smoothed; and
a corrector configured to perform shading correction with the generated corrected shading data,
the first extractor, the second extractor, the intersection point calculator, the phase shift amount calculator, the phase shifter, the generator, and the corrector being implemented by circuitry.

2. The shading correction device of claim 1, wherein the phase shift amount calculator uses a plurality of parameter values for calculating a plurality of phase shift amounts to calculate the phase shift amount at the each of the plurality of positions.

3. The shading correction device of claim 1, wherein the first extractor smooths the first periodic component of the original shading data to obtain smoothed original shading data, subtracts the smoothed original shading data from the original shading data to obtain subtracted original shading data, and outputs the subtracted original shading data as the first periodic component, and
wherein the second extractor smooths the second periodic component of the second reading result to obtain smoothed second reading result, subtracts the smoothed second reading result from the second reading result to obtain subtracted second reading result, and outputs the subtracted second reading result as the second periodic component.

4. The shading correction device of claim 1, further comprising a detector configured to detect an anomalous data portion based on the first periodic component and the second periodic component,
wherein the generator replaces the first periodic component with the first periodic component with the shifted phase at a position of a pixel corresponding to the detected anomalous data portion to generate the corrected shading data.

5. The shading correction device of claim 4, further comprising a determiner, implemented by the circuitry, configured to determine a phase shift amount of a block corresponding to the detected anomalous data portion, and
wherein the determiner interpolates the determined phase shift amount of the block.

6. The shading correction device of claim 4, further comprising an output ratio calculator, implemented by the circuitry, configured to calculate an output ratio between the original shading data and the second reading result,
wherein the generator generates the corrected shading data based on the calculated output ratio.

7. The shading correction device of claim 1, wherein the phase shift amount calculator performs boundary processing on the first periodic component at a plurality of boundaries between a plurality of pixels to calculate the phase shift amount at the each of the plurality of positions.

8. A reading device comprising:
a plurality of pixels; and
the shading correction device of claim 1 configured to perform the shading correction on a read signal with the corrected shading data, the read signal being input from each of the plurality of pixels.

9. An image forming apparatus comprising:
a reading device configured to read an image from a reading target, the reading device including
a plurality of pixels, and
the shading correction device of claim 1 configured to perform the shading correction on the read image with the corrected shading data, the read image corresponding to a read signal input from each of the plurality of pixels; and
an image forming device configured to form, on a medium, the read image subjected to the shading correction.

10. A shading correction method comprising:
  extracting a first periodic component of original shading data, the original shading data being a first reading result obtained through reading a density reference member;
  extracting a second periodic component of a second reading result, the second reading result being obtained through reading the density reference member at a time different from a time of reading the density reference member to obtain the original shading data;
  calculating a first intersection point of the first periodic component and a reference level and a second intersection point of the second periodic component and the reference level;
  calculating a phase shift amount at each of a plurality of positions based on a difference between the first intersection point and the second intersection point;
  shifting a phase of the first periodic component based on the calculated phase shift amount at the each of the plurality of positions;
  generating corrected shading data including the first periodic component with the shifted phase and the original shading data with the first periodic component smoothed; and
  performing shading correction with the generated corrected shading data.

11. The shading correction method of claim 10, wherein the calculating the phase shift amount calculates the phase shift amount at the each of the plurality of positions using a plurality of parameter values for calculating a plurality of phase shift amounts.

12. The shading correction method of claim 10, wherein the extracting the first periodic component includes
  smoothing the first periodic component of the original shading data to obtain smoothed original shading data,
  subtracting the smoothed original shading data from the original shading data to obtain subtracted original shading data, and
  outputting the subtracted original shading data as the first periodic component, and
  wherein extracting the second periodic component includes
  smoothing the second periodic component of the second reading result to obtain smoothed second reading result,
  subtracting the smoothed second reading result from the second reading result to obtain subtracted second reading result, and
  outputting the subtracted second reading result as the second periodic component.

13. The shading correction method of claim 10, further comprising detecting an anomalous data portion based on the first periodic component and the second periodic component,
  wherein the generating includes replacing the first periodic component with the first periodic component with the shifted phase at a position of a pixel corresponding to the detected anomalous data portion to generate the corrected shading data.

14. The shading correction method of claim 13, further comprising calculating an output ratio between the original shading data and the second reading result, and
  wherein the generating includes generating the corrected shading data based on the calculated output ratio.

15. The shading correction method of claim 10, wherein the calculating the phase shift amount includes performing boundary processing on the first periodic component at a plurality of boundaries between a plurality of pixels to calculate the phase shift amount at the each of the plurality of positions.

16. The shading correction method of claim 13, further comprising:
  determining a phase shift amount of a block corresponding to the detected anomalous data portion; and
  interpolating the determined phase shift amount of the block.

17. A non-transitory recording medium storing a plurality of instructions which, when executed by one or more processors, cause the processors to perform a shading correction method comprising:
  extracting a first periodic component of original shading data, the original shading data being a first reading result obtained through reading a density reference member;
  extracting a second periodic component of a second reading result, the second reading result being obtained through reading the density reference member at a time different from a time of reading the density reference member to obtain the original shading data;
  calculating a first intersection point of the first periodic component and a reference level and a second intersection point of the second periodic component and the reference level;
  calculating a phase shift amount at each of a plurality of positions based on a difference between the first intersection point and the second intersection point;
  shifting a phase of the first periodic component based on the calculated phase shift amount at the each of the plurality of positions;
  generating corrected shading data including the first periodic component with the shifted phase and the original shading data with the first periodic component smoothed; and
  performing shading correction with the generated corrected shading data.

* * * * *